(12) United States Patent  
Boguraev et al.

(10) Patent No.: US 10,769,375 B2  
(45) Date of Patent: Sep. 8, 2020

(54) DOMAIN-SPECIFIC LEXICAL ANALYSIS

(71) Applicant: International Business Machines Corporation, Armonk, NY (US)

(72) Inventors: Branimir K. Boguraev, Bedford, NY (US); Esme Manandise, Tallahassee, FL (US); Benjamin P. Segal, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/679,719

(22) Filed: Aug. 17, 2017

(65) Prior Publication Data

US 2019/0057077 A1 Feb. 21, 2019

(51) Int. Cl.
  *G06F 40/284* (2020.01)
  *G06F 40/205* (2020.01)
(52) U.S. Cl.
  CPC .......... *G06F 40/284* (2020.01); *G06F 40/205* (2020.01)
(58) Field of Classification Search
  CPC ..... G06F 17/277; G06F 40/284; G06F 40/205
  USPC ...................................................... 704/9, 10
  See application file for complete search history.

(56) References Cited

U.S. PATENT DOCUMENTS

| | | | |
|---|---|---|---|
| 4,942,526 A | 7/1990 | Okajima et al. | |
| 5,383,120 A | 1/1995 | Zernik | |
| 5,878,386 A | 3/1999 | Coughlin | |
| 5,991,712 A * | 11/1999 | Martin | G10L 15/1815 704/10 |
| 6,173,298 B1 | 1/2001 | Smadja | |
| 6,182,028 B1 * | 1/2001 | Karaali | G10L 15/18 704/10 |
| 6,212,494 B1 * | 4/2001 | Boguraev | G06F 17/2775 704/10 |

(Continued)

FOREIGN PATENT DOCUMENTS

| | | |
|---|---|---|
| CN | 102902806 A | 1/2013 |
| CN | 103678278 A | 3/2014 |
| WO | WO2017107518 A1 | 6/2017 |

OTHER PUBLICATIONS

Baud, et al., "Morpho-Semantic Parsing of Medical Expressions", AMIA, Inc., 1998, pp. 760-764.

(Continued)

*Primary Examiner* — Shaun Roberts  
(74) *Attorney, Agent, or Firm* — Stephen R. Yoder

(57) ABSTRACT

A computer program product for domain-specific data generation. The computer program product including a computer-readable storage medium having program instructions embodied therewith. The program instructions executable by a processor to cause the processor to perform operations including performing an analysis on a domain-specific corpus to identify a base term and a modifier term. The modifier term modifies the base term in at least a portion of the domain-specific corpus. The operations also include accessing a first entry in lexicon data. The first entry including core data corresponding to domain-independent lexical information for the base term. The operations further include adding, based on the analysis, non-core data to the first entry, the non-core data corresponding to domain-specific lexical information for the base term, wherein the non-core data identifies the modifier term as a domain-specific modifier of the base term.

12 Claims, 11 Drawing Sheets

(56) References Cited

U.S. PATENT DOCUMENTS

| | | |
|---|---|---|
| 6,275,791 B1 | 8/2001 | Weise |
| 6,278,967 B1 | 8/2001 | Akers et al. |
| 6,853,962 B2 | 2/2005 | Appleby |
| 7,146,308 B2 | 12/2006 | Lin et al. |
| 7,421,386 B2 | 9/2008 | Powell et al. |
| 7,526,424 B2* | 4/2009 | Corston-Oliver ............ G06F 17/2881 704/2 |
| 7,873,992 B1 | 1/2011 | Daily et al. |
| 8,145,474 B1 | 3/2012 | Daily et al. |
| 8,359,309 B1 | 1/2013 | Provine et al. |
| 8,370,128 B2 | 2/2013 | Brun et al. |
| 8,762,131 B1 | 6/2014 | Diaconescu et al. |
| 9,336,290 B1* | 5/2016 | Truher ............ H04L 67/1085 |
| 9,412,364 B2 | 8/2016 | Blanchard et al. |
| 9,460,078 B2* | 10/2016 | Dwarakanath ...... G06F 17/2765 |
| 9,471,562 B2 | 10/2016 | Anisimovich et al. |
| 9,588,959 B2 | 3/2017 | Boguraev et al. |
| 9,645,993 B2 | 5/2017 | Zuev et al. |
| 9,659,005 B2 | 5/2017 | Ramish |
| 2002/0007266 A1 | 1/2002 | Poznanski et al. |
| 2003/0004915 A1* | 1/2003 | Lin ............ G06F 17/271 |
| 2005/0043940 A1 | 2/2005 | Elder |
| 2007/0055491 A1* | 3/2007 | Manson ............ G06F 17/2785 704/9 |
| 2008/0010274 A1 | 1/2008 | Carus et al. |
| 2008/0172409 A1 | 7/2008 | Botros et al. |
| 2008/0275694 A1 | 11/2008 | Varone |
| 2010/0121630 A1 | 5/2010 | Mende et al. |
| 2012/0072204 A1 | 3/2012 | Nasri et al. |
| 2014/0142924 A1 | 5/2014 | Friedman |
| 2014/0172417 A1* | 6/2014 | Monk, II ............ G06F 17/2785 704/9 |
| 2014/0278365 A1* | 9/2014 | Zhang ............ G06F 17/2785 704/9 |
| 2015/0286618 A1 | 10/2015 | Walker |
| 2015/0331850 A1 | 11/2015 | Ramish |
| 2016/0026621 A1* | 1/2016 | Misra ............ G06F 17/2785 704/9 |
| 2016/0179783 A1 | 6/2016 | Boguraev et al. |
| 2016/0259851 A1* | 9/2016 | Hopkins ............ G06F 17/2725 |

OTHER PUBLICATIONS

Shimohata, et al., "Retrieving Collocations by Co-Occurrences and Word Order Constraints", Proceedings of the 8th Conference on European Chapter of the Association for Computational Linguistics, 1997, pp. 476-481.

Wehrli, et al., "Collocations in a Rule-Based MT System: A Case Study Evaluation of their Translation Adequacy", Proceedings of the 13th Annual Meeting of the European Association for Machine Translation, 2009, pp. 128-135.

Wehrli, Eric, "The Relevance of Collocations for Parsing", Proceedings of the 10th Workshop on Multiword Expressions, 2014, pp. 26-32.

Wehrli, et al., "Sentence Analysis and Collocation Identification", COLING Workshop on Multiword Expressions (MWE 2010), pp. 27-35.

PCT International Search Report and Written Opinion for corresponding PCT Application No. PCT/IB2018/055816, dated Oct. 31, 2018, 9 pages.

"List of IBM Patents or Patent Applications Treated as Related", 2 pages.

PCT International Search Report and Written Opinion for corresponding PCT Application No. PCT/IB2018/055818, dated Dec. 12, 2018, 9 pages.

* cited by examiner

INPUT TEXT 802: The patient suffers from high cholesterol, triglycerides and hypertension PARTIALLY PARSED AND BRACKETED INPUT TEXT 882: The patient suffers from [[ADJ high] [N cholesterol], [N triglycerides]]] and [N hypertension]

INPUT TEXT 804: The patient has a lower extremity edema

PARTIALLY PARSED AND BRACKETED INPUT TEXT 884: The patient has a [[ADJ lower] [N extremity]] [N edema]

INPUT TEXT 806: Release of Mr. Shah from Emergency Room by Dr. Smith at 2 PM with Mrs. Shah PARTIALLY PARSED AND BRACKETED INPUT TEXT 886: Release of [V Mr. Shah] from [W Emergency Room] by [X Dr. Smith] at [Y 2 PM] with [Z Mrs. Shah]

INPUT TEXT 808: Prescribing of acetaminophen by Dr. Smith at Emergency Room

PARTIALLY PARSED AND BRACKETED INPUT TEXT 888: [ACTION Prescribing] [PREP of] [DRUG acetaminophen] [PREP by] [AGENT Dr. Smith] [PREP at] [LOCATION Emergency Room]

902
Perform an analysis of domain-specific text to identify a base term and a modifier term, where the modifier term modifies the base term in at least a portion of the domain-specific text

904
Access a first entry in lexicon data, the first entry including core data corresponding to domain-independent lexical information for the base term

904
Add, based on the analysis, non-core data to the first entry, the non-core data corresponding to domain-specific lexical information for the base term, where the non-core data identifies the modifier term as a domain-specific modifier of the base term

FIG. 9

DOMAIN-SPECIFIC LEXICAL ANALYSIS

I. BACKGROUND

The present application relates to domain-specific lexical analysis.

II. SUMMARY

In a particular implementation, a method includes performing, at a device, an analysis on domain-specific corpus to identify a base term and a modifier term. The modifier term modifies the base term in at least a portion of the domain-specific corpus. The method also includes accessing, by the device, a first entry in lexicon data. The first entry includes core data corresponding to domain-independent lexical information for the base term. The method further includes adding, based on the analysis, non-core data to the first entry. The non-core data corresponds to domain-specific lexical information for the base term. The non-core data identifies the modifier term as a domain-specific modifier of the base term.

In another particular implementation, a computer program product for domain-specific data generation includes a computer-readable storage medium having program instructions embodied therewith. The program instructions are executable by a processor to cause the processor to perform operations including performing an analysis on domain-specific corpus to identify a base term and a modifier term. The modifier term modifies the base term in at least a portion of the domain-specific corpus. The operations also include accessing a first entry in lexicon data. The first entry includes core data corresponding to domain-independent lexical information for the base term. The operations further include adding, based on the analysis, non-core data to the first entry. The non-core data corresponds to domain-specific lexical information for the base term. The non-core data identifies the modifier term as a domain-specific modifier of the base term.

In another particular implementation, a system includes a memory and a lexical analyzer. The memory is configured to store lexicon data. The lexical analyzer is configured to perform an analysis on domain-specific corpus to identify a base term and a modifier term. The modifier term modifies the base term in at least a portion of the domain-specific corpus. The lexical analyzer is also configured to access a first entry in the lexicon data, the first entry including core data corresponding to domain-independent lexical information for the base term. The lexical analyzer is further configured to add, based on the analysis, non-core data to the first entry. The non-core data corresponds to domain-specific lexical information for the base term. The non-core data identifies the modifier term as a domain-specific modifier of the base term.

III. BRIEF DESCRIPTION OF THE DRAWINGS

FIG. 8 illustrates examples of input text processed by the system of FIG. 4.

FIG. 9 illustrates a flowchart of a method of domain-specific lexical analysis.

IV. DETAILED DESCRIPTION

Figure 1:
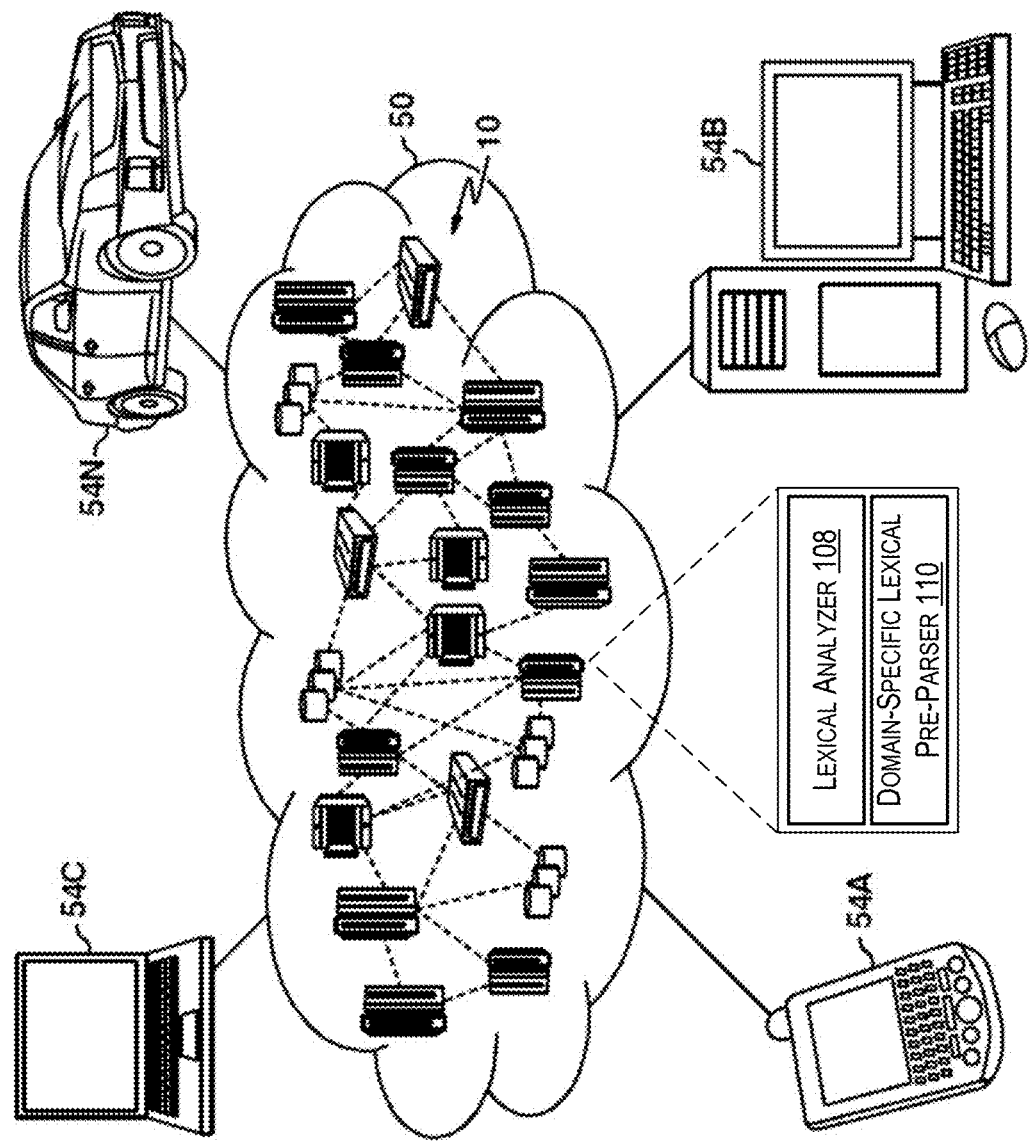
FIG. 1 illustrates a cloud computing environment according to an aspect of the disclosure.

Systems and methods of domain-specific lexical analysis and domain-specific pre-parsing are disclosed. Natural language processing uses lexical data to parse language samples (e.g., a text). In many languages, a particular word can have different meanings depending on context. For example, when a particular word is used in text of a particular technical field (e.g., in a domain-specific context), the word may have a different meaning or nuance than when the word is present in general usage (e.g., in a domain-independent context). Manually adapting a general purpose (e.g., domain-independent) rule-based parser to a specialized domain (e.g., medicine) is non-trivial (e.g., complicated, time-consuming, and very likely incomplete). Specialized domains may introduce syntactic patterns and may present with syntactic ambiguity types that are less common in the general domain. Automating (or semi-automating) rule creation, as described herein, conserves resources (e.g., time) and may result in a more robust parser (e.g., fewer errors and greater coverage).

According to techniques described herein, during a training phase, a lexical analyzer (e.g., a processor) may generate domain-specific parsing rules based on analyzing a domain-specific corpus associated with a domain (e.g., medicine). The lexical analyzer may also update a database of lexicon data based on analyzing the domain-specific corpus. The lexicon data may be previously generated, received from another device, or both. The lexicon data may include domain-independent information (e.g., core data), such as parts of speech of base terms (e.g., nouns). The lexical analyzer may update the lexicon data to include domain-specific information (e.g., non-core data) corresponding to the base terms. For example, the lexical analyzer may analyze large bodies of domain-specific texts to generate co-occurrence statistics of head-modifier pairs in the domain-specific texts. The lexical analyzer may determine, based on the co-occurrence statistics, that particular terms (e.g., "high", "blood", or "plasma") appear to modify a base term (e.g., "cholesterol") in at least a portion of a domain-specific corpus, as described herein. The lexical analyzer may update the lexicon data to indicate that the particular terms are usable as modifier terms of the base term in the domain (e.g., medicine).

The lexical analyzer may generate domain-specific parsing rules corresponding to the modifier terms and the base terms, as described herein. For example, the lexical analyzer may generate a collocation rule (e.g., left attachment of adjectival modifier terms) in response to determining that modifier terms (e.g., "high", "bad", "elevated", and "good") of a particular modifier type (e.g., adjectival modifier terms) are detected in a particular position relative to (e.g., prior to)

corresponding base terms in the domain-specific corpus. The training phase may happen offline (e.g., prior to running in production mode). The domain-specific parsing rules and the domain-specific information of the lexicon data may be used to train a domain-specific parser. For example, the lexical analyzer may provide the domain-specific parsing rules and the lexicon data (e.g., including the domain-specific information) to the domain-specific parser.

During a runtime phase, a parser that includes the domain-specific parser and a domain-independent parser (e.g., a general purpose parser) may parse input text. The input text parsed during the runtime phase may differ from the domain-specific corpus analyzed during the training phase. The lexical analyzer analyzes, during the training phase, the domain-specific corpus to generate the domain-specific parsing rules and the domain-specific information of the lexicon data. During the runtime phase, the parser uses the domain-specific parsing rules and the lexicon data, in addition to domain-independent parsing rules, to parse the input text. For example, the domain-specific parser may analyze input text based on the lexicon data and the domain-specific parsing rules, as described herein. The domain-specific parser may generate partially parsed and bracketed text by analyzing the input text (e.g., "The patient suffers from high blood cholesterol."), as described herein. The partially parsed and bracketed text (e.g., "The patient suffers from [high [blood cholesterol]]") may indicate phrasal boundary attachments that are valid in the domain (e.g., medicine). The domain-specific parser may provide the partially parsed and bracketed text to a domain-independent parser (e.g., a general purpose parser).

The domain-independent parser may, in response to receiving the partially parsed and bracketed text from the domain-specific parser, generate parsed text by analyzing the partially parsed and bracketed text based on domain-independent parsing rules. The domain-independent parsing rules may be previously generated, received from another device, or both. In a particular example, the partially parsed and bracketed text may correspond to an intermediate parse tree. The domain-independent parser may generate a parse tree corresponding to the parsed text by analyzing the intermediate parse tree based on the domain-independent parsing rules.

The lexical analyzer, the domain-specific parser, and the domain-independent parser may be useful in various applications. For example, the lexical analyzer may generate domain-specific parsing rules and update lexicon data based on analyzing a domain-specific corpus (e.g., research papers) associated with a domain (e.g., medicine). An emergency medical technician (EMT) may upload patient notes to a hospital system upon examination of a patient in an ambulance. The patient notes (e.g., input text) may be analyzed by the domain-specific parser and the domain-independent parser to generate parsed text. The hospital system may generate an alert in response to determining that the parsed text indicates that particular conditions have been detected. The alert may enable the appropriate resources (e.g., equipment, medical staff, medicines, or a combination thereof) to be prepared to treat the patient when the ambulance arrives at a hospital.

As another example, during a breakout of a rare disease, a doctor may locate a large number of research papers associated with the rare disease. The lexical analyzer may generate domain-specific parsing rules and update lexicon data based on a few of the research papers. The domain-specific parser and the domain-independent parser may analyze the research papers (e.g., all of the research papers) to generate parsed text. The parsed text may be used to populate a research database. Searching the research database for relevant information may conserve time, as compared to reading each of the research papers.

It should be understood that medicine is used as an illustrative example, and the domain may correspond to any specialized domain, such as an area of study (e.g., engineering, law, medicine, or chemistry), a language (e.g., French, Spanish, or Italian), a programming language (e.g., Java® (registered trademark of Oracle, Inc., Redwood Shores, Calif.), Python® (registered trademark of Python Software Foundation, Delaware), etc.), another specialized domain, or a combination thereof.

It is to be understood that although this disclosure includes a detailed description on cloud computing, implementation of the teachings recited herein are not limited to a cloud computing environment. Rather, aspects of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In some implementations, this cloud model may include at least five characteristics, at least three service models, and at least four deployment models, as described herein.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate.

Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. One or more of the nodes 10 may include a lexical analyzer 108, a domain-specific lexically-driven pre-parser 110, or both. The lexical analyzer 108, the domain-specific lexically-driven pre-parser 110, or both, may correspond to infrastructure, platforms, and/or software provided as services by the cloud computing environment 50. The lexical analyzer 108 may be configured to analyze a domain-specific corpus to generate domain-specific information (e.g., non-core data), domain-specific parsing rules, or a combination thereof, as further described with reference to FIG. 3. The domain-specific corpus may be associated with a domain. The lexical analyzer 108 may update lexicon data to indicate the non-core data associated with the domain, as further described with reference to FIG. 3.

The domain-specific lexically-driven pre-parser 110 may be configured to generate partially parsed and bracketed input text by analyzing input text based on the updated lexicon data and the domain-specific parsing rules, as further described with reference to FIGS. 4-5. A domain-independent rule-based parser may generate parsed text by analyzing the partially parsed and bracketed input text based on domain-independent parsing rules, as further described with reference to FIGS. 4-5. Applying the domain-independent parsing rules to the partially parsed and bracketed input text may result in fewer parsing errors (e.g., no errors), as compared to applying the domain-independent parsing rules directly to the input text. For example, the partially parsed and bracketed input text may indicate phrasal boundaries that are valid in the domain and may thus resolve at least some syntactic ambiguity that would otherwise have resulted in parsing errors.

It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
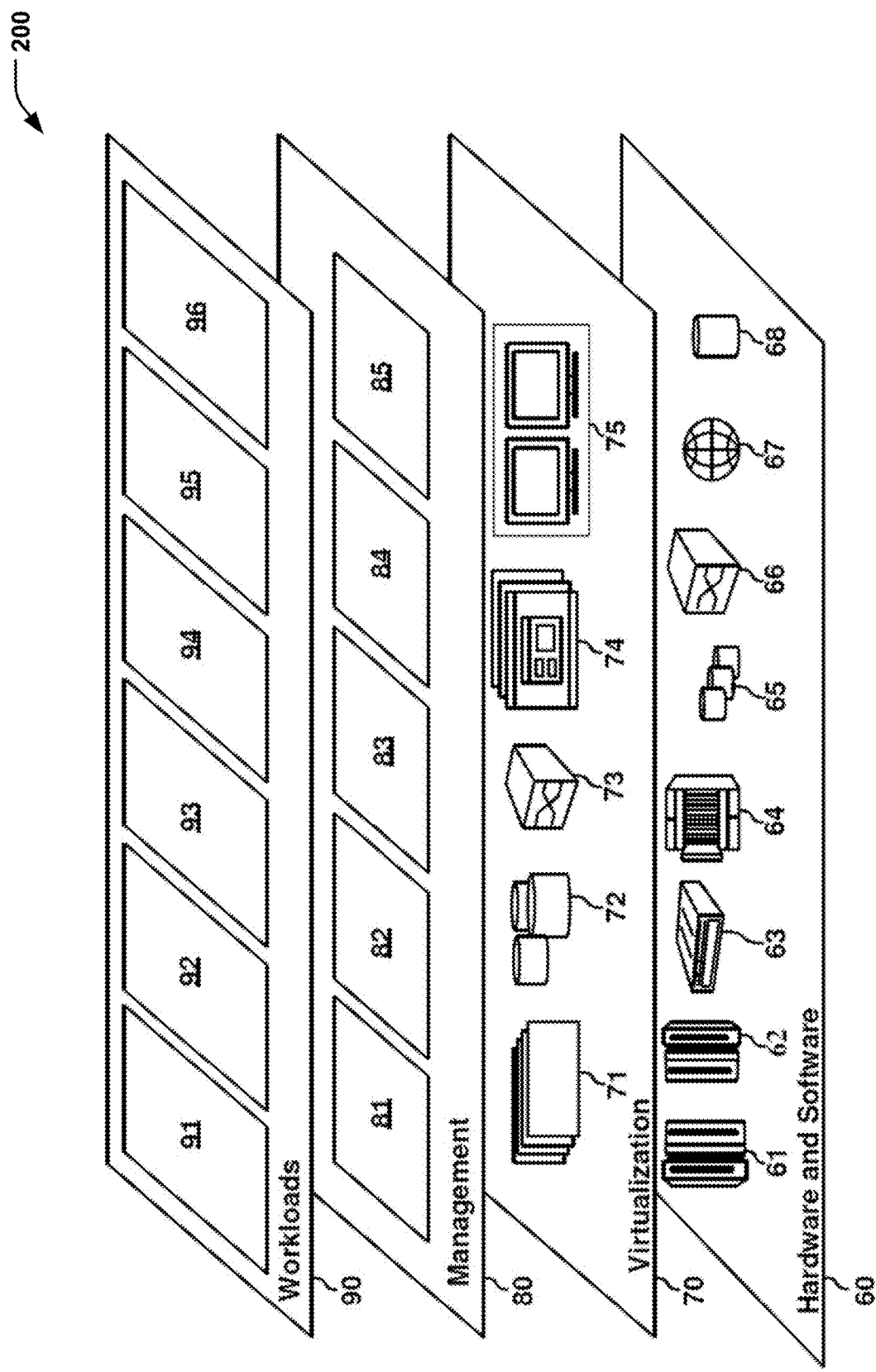
FIG. 2 illustrates abstraction model layers according to an aspect of the disclosure.

Referring to FIG. 2, a set of functional abstraction layers provided by cloud computing environment 50 (FIG. 1) is shown. It should be understood in advance that the components, layers, and functions shown in FIG. 2 are intended to be illustrative only and aspects of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some aspects, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and domain-specific analysis 96. In a particular aspect, the domain-specific analysis 96 may include domain-specific lexical analysis, as described herein with reference to the lexical analyzer 108. In a particular aspect, the domain-specific analysis 96 may include domain-specific lexically-driven pre-parsing, as described herein with reference to the domain-specific lexically-driven pre-parser 110.

Figure 3:
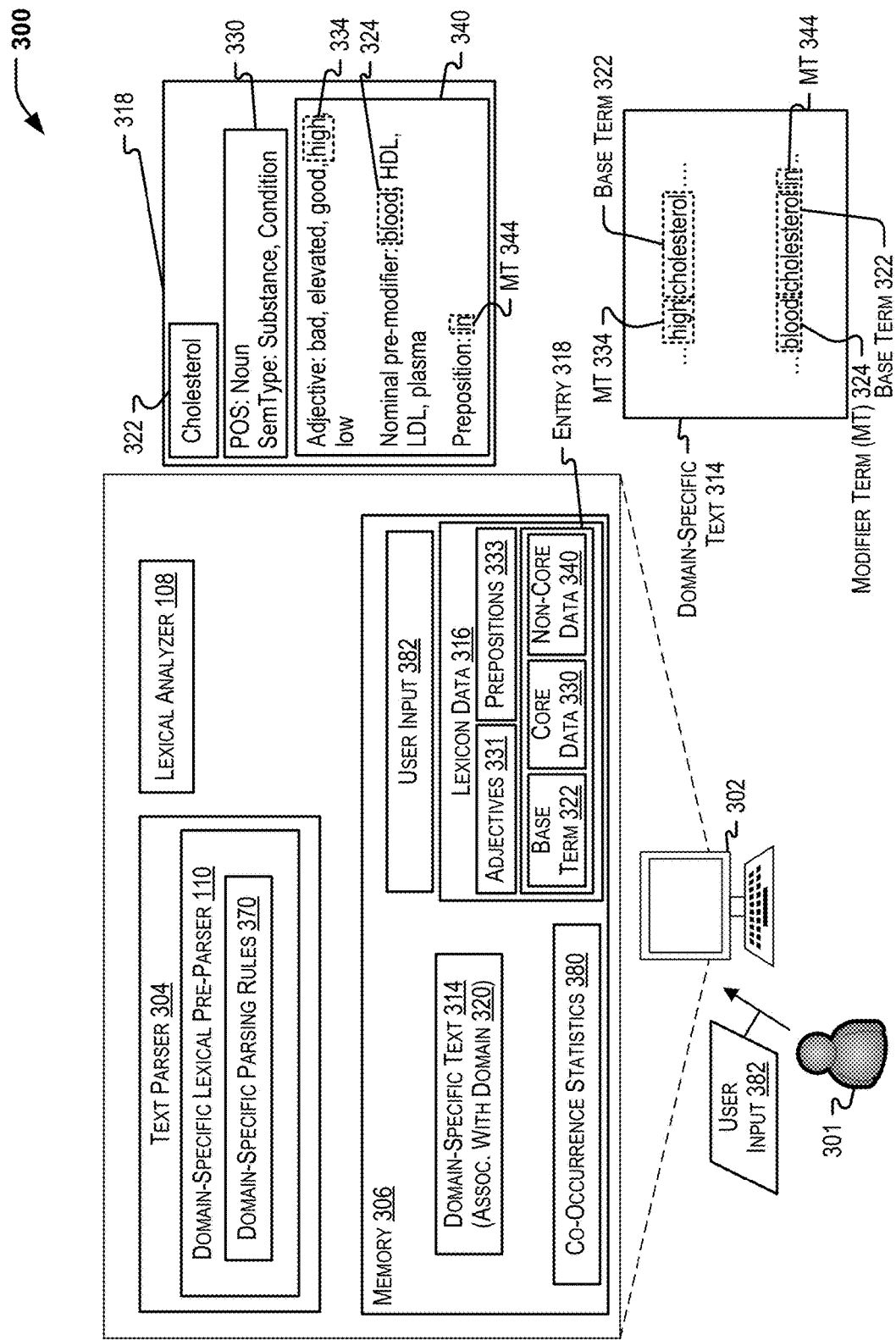
FIG. 3 illustrates a system for domain-specific lexical analysis.

FIG. 3 illustrates a system 300 for performing domain-specific lexical analysis. The system 300 includes a device 302. The device 302 may include a processor, a computer, a laptop computer, a server, a communication device, an entertainment device, or a combination thereof. The device 302 includes (or accesses) the lexical analyzer 108, a text parser 304, a memory 306, or a combination thereof. The lexical analyzer 108 may correspond to software, such as instructions executable by a processor to perform one or more operations described with reference to FIGS. 1-11. In a particular aspect, the lexical analyzer 108 may correspond to a processor configured to perform one or more operations described with reference to FIGS. 1-11. The text parser 304 includes the domain-specific lexically-driven pre-parser 110. The domain-specific lexically-driven pre-parser 110 may correspond to software, such as instructions executable by a processor to perform one or more operations described with reference to FIGS. 1-11. In a particular aspect, the domain-specific lexically-driven pre-parser 110 may correspond to a processor configured to perform one or more operations described with reference to FIGS. 1-11.

In a particular aspect, the device 302 may correspond to one or more of the cloud computing nodes 10 of FIG. 1. For example, the device 302 may provide the lexical analyzer 108 (e.g., software corresponding to the lexical analyzer 108) or functions of the lexical analyzer 108 as a service. In an alternate aspect, the device 302 may correspond to a cloud consumer device, such as, for example, the personal digital assistant (PDA) or cellular telephone 54A, the desktop computer 54B, the laptop computer 54C, the automobile computer system 54N of FIG. 1, or a combination thereof. The device 302 may receive the lexical analyzer 108 (e.g., software corresponding to the lexical analyzer 108) or access functions of the lexical analyzer 108 as a service provided by one or more of the cloud computing nodes 10 of FIG. 1.

The memory 306 may be configured to store lexicon data 316. The lexicon data 316 may be previously generated by the device 302, received by the device 302 from another device, provided by a user 301 to the device 302, or a combination thereof. The lexicon data 316 may correspond to a data structure (e.g., a table) arranged to have one or more entries. Each entry of the lexicon data 316 may include a base term (e.g., a noun), core data associated with the base term, or both. The core data may indicate domain-independent information associated with the base term. The domain-independent information may indicate a part of speech (e.g., noun) of the base term, one or more semantic types (or semantic categories) of the base term, or a combination thereof.

A semantic type may include physical object, conceptual entity, activity, phenomenon, process, or another semantic type. A semantic type may correspond to one or more additional semantic types (e.g., sub-types) that correspond to a higher level of detail or a narrower classification. For example, physical object may include an organism, an anatomical structure, a manufactured object, a substance, or another type of physical object.

In a particular aspect, various entries of the lexicon data 316 may indicate semantic types at distinct levels of detail. For example, an entry of the lexicon data 316 may indicate a first semantic type (e.g., plant) of a corresponding base term (e.g., "aloe"), and another entry of the lexicon data 316 may indicate a second semantic type (e.g., substance) of a corresponding base term (e.g., "cholesterol"). The first semantic type (e.g., plant) may correspond to a higher level of detail than the second semantic type (e.g., substance). For example, the first semantic type (e.g., plant) may correspond to a semantic sub-sub-type (e.g., physical object→organism→plant) and the second semantic type (e.g., substance) may correspond to a semantic sub-type (e.g., physical object→substance).

In a particular example, the lexicon data 316 includes an entry 318. The entry 318 includes a base term 322 (e.g., "cholesterol"). The entry 318 may include core data 330 associated with the base term 322. The core data 330 may indicate a part of speech (e.g., noun) of the base term 322 (e.g., "cholesterol"). The core data 330 may indicate a first semantic type (e.g., substance), a second semantic type (e.g., condition), one or more additional semantic types of the base term 322, or a combination thereof.

The lexical analyzer 108 is configured to generate non-core data based on analyzing a domain-specific corpus 314, user input 382, or a combination thereof, as described herein. For example, the lexical analyzer 108 may generate non-core data 340 associated with the base term 322 (e.g., "cholesterol"), as described herein. The domain-specific corpus 314 is associated with a domain 320 (e.g., medicine). The domain 320 may correspond to an area of study (e.g., medicine, engineering, art, music, finance, oil & gas, etc.), a language (e.g., English, French, Spanish, etc.), a programming language (e.g., Java® (registered trademark of Oracle, Inc., Redwood Shores, Calif.), Python® (registered trademark of Python Software Foundation, Delaware), etc.), another domain, or a combination thereof.

The non-core data may indicate domain-specific information associated with base terms. For example, the non-core data 340 may indicate domain-specific information associated with the base term 322 (e.g., "cholesterol"). To illustrate, the non-core data 340 may indicate one or more modifier terms that are usable to modify the base term 322 in the domain 320. A modifier term may include at least one of an adjectival modifier term, a preposition modifier term, a nominal modifier term, or another modifier term. An adjectival modifier term may correspond to an adjective as a modifier term of a base term. A nominal modifier term may correspond to a noun as a modifier term of a base term. A nominal modifier term (e.g., "blood") may function as an adjective in relation to the base term (e.g., "cholesterol") in a phrase (e.g., "blood cholesterol"). A preposition modifier term may correspond to a preposition as a modifier term of a base term.

A nominal modifier term may include a nominal pre-modifier term or a nominal post-modifier term. An adjectival modifier term may include an adjectival pre-modifier term or an adjectival post-modifier term. A preposition modifier term may include a preposition post-modifier term. A pre-modifier term (e.g., a nominal pre-modifier term or an adjectival pre-modifier term) may be prior to the base term in a phrase. For example, a pre-modifier term (of the domain 320) may be to the left of a corresponding base term in a phrase if phrases in the domain 320 are to be read from left to right. A post-modifier term may be subsequent to the base term in a phrase. For example, a post-modifier term (of the domain 320) may be to the right of a corresponding base term if phrases in the domain 320 are to be read from left to right.

The lexical analyzer 108 is configured to generate domain-specific parsing rules 370 based on analyzing the domain-specific corpus 314, the user input 382, or a combination thereof, as further described with reference to FIG. 7. The domain-specific parsing rules 370 may include at least one of a collocation rule, a morpho-semantic rule, a named-entity-based pattern rule, or a semantico-syntactic pattern rule, as described with reference to FIG. 7. A collocation rule may indicate whether a modifier term of a particular type is a pre-modifier term or a post-modifier term. For example, a first collocation rule may indicate that an adjectival modifier term is a pre-modifier term, and a second collocation rule may indicate that a preposition modifier term is a post-modifier term.

A morpho-semantic rule may indicate whether a particular term is usable (e.g., valid) as a modifier term of a term having particular semantic features. For example, a particular morpho-semantic rule may indicate that a term having particular semantic features (e.g., low, high, or elevated) is not valid as modifier term of a term having a particular prefix (e.g., "hyper"). The particular semantic features may correspond to an "intensity" semantic feature.

A named-entity-based pattern rule may indicate a pattern of terms, where the pattern includes one or more named entities. A named entity generally includes a word (or a group of words) that identifies an entity by name and which belongs to a particular semantic type. For example, the particular semantic type may include person, event, date, organization, place, artifact, or monetary expression. In another example, the particular semantic type may be more fine-grained, such as person_name, person_role, or event_sporting. In a particular aspect, the particular semantic type may be even more specific, such as person_name_author, or event_sporting_football. Various named-entity-based pattern rules may be formed corresponding to named-entities X, Y and Z, such as X will take place on Z at Y, or Y is the location for the X of Z, where X has a semantic type of event, Y has a semantic type of place, and Z has a semantic type of date.

A semantico-syntactic pattern rule may indicate a pattern of terms, where the pattern indicates phrase types and semantic types of one or more terms. For example, a particular semantico-syntactic pattern rule (e.g., [action] [prep] {substance|drug}) may indicate that an action phrase (e.g., "prescribing") followed by a preposition (e.g., "of") followed by a term (e.g., "acetaminophen") having a first semantic type (e.g., substance) or a second semantic type (e.g., drug) satisfies the particular semantico-syntactic pattern rule.

The lexical analyzer 108 may provide the domain-specific parsing rules 370 to the domain-specific lexically-driven pre-parser 110. The domain-specific lexically-driven pre-parser 110 is configured to generate partially parsed and bracketed text based on the domain-specific parsing rules 370, as further described with reference to FIG. 4. For example, the domain-specific lexically-driven pre-parser 110 may generate partially parsed and bracketed text by applying the domain-specific parsing rules 370 to input text, as described herein. The partially parsed and bracketed text may correspond to (e.g., represent) an intermediate parse tree, as further described with reference to FIG. 5. The partially parsed and bracketed text (e.g., the intermediate parse tree) may indicate phrasal boundary attachments that are valid in the domain 320. A domain-independent rule-based parser may be configured to generate parsed text based on the output of the domain-specific lexically-driven pre-parser 110, as further described with reference to FIG. 4. For example, the domain-independent rule-based parser may generate a parse tree by applying domain-independent parsing rules to the intermediate parse tree, as further described with reference to FIG. 5. The parse tree may correspond to (e.g., represent) the parsed text. It should be understood that a parse tree is used as an illustrative example, the parsed text (or the partially parsed and bracketed text) may be represented in various ways.

During operation, the lexical analyzer 108 may determine that the domain-specific corpus 314 is to be analyzed. For example, the lexical analyzer 108 may receive the user input 382 from the user 301 indicating that the domain-specific corpus 314 is to be analyzed. The lexical analyzer 108 may be configured to analyze the domain-specific corpus 314 as corresponding to the domain 320. In a particular aspect, the lexical analyzer 108 determines whether the domain-specific corpus 314 is associated with the domain 320. For example, the lexical analyzer 108 may use a heuristic-based approach to determine that the domain-specific corpus 314 is likely to be associated with the domain 320. As another example, the lexical analyzer 108 may receive the user input 382 from the user 301 (or data from another device) indicating that the domain-specific corpus 314 is associated with the domain 320. For example, the user input 382 (or the data) may include an identifier of the domain-specific corpus 314 (e.g., a file identifier) and an identifier (e.g., "# medicine") of the domain 320.

The lexical analyzer 108 may generate terms (e.g., words) by parsing the domain-specific corpus 314. The lexical analyzer 108 may compare the terms to base terms indicated by the lexicon data 316. The lexical analyzer 108 may generate co-occurrence statistics 380 corresponding to base terms indicated by the lexicon data 316. For example, the lexical analyzer 108 may, in response to determining that the lexicon data 316 includes the base term 322 (e.g., "cholesterol"), generate the co-occurrence statistics 380 to indicate a number of times another term appears to modify the base term 322 in at least a portion of the domain-specific corpus 314. The base term 322 and the other term may correspond to a head-modifier pair. The lexical analyzer 108 may determine that another term appears to modify the base term 322 in response to detecting the other term in proximity (e.g., next) to the base term 322 in the domain-specific corpus 314. For example, the co-occurrence statistics 380 may indicate that a first term (e.g., "high") has occurred a first number of times next to and before the base term 322 (e.g., "cholesterol"), a second term (e.g., "blood") has occurred a second number of times next to and before the base term 322, and a third term (e.g., "in") has occurred a third number of times next to and after the base term 322.

The lexical analyzer 108 may designate an identified term as a modifier term of the base term 322 in response to determining that the co-occurrence statistics 380 indicate that the identified term appears to modify the base term 322 at least a threshold number of times in the domain-specific corpus 314. For example, the lexical analyzer 108 may, in response to determining that the first number of times satisfies the threshold, designate the first term (e.g., "high") as a modifier term 334 of the base term 322. The lexical analyzer 108 may, in response to determining that the second number of times satisfies the threshold, designate the second term (e.g., "blood") as a modifier term 324 of the base term 322. The lexical analyzer 108 may, in response to determining that the third number of times satisfies the threshold, designate the third term (e.g., "in"), as a modifier term 344 of the base term 322.

In a particular aspect, the lexical analyzer 108 may determine that a particular term (e.g., "expensive") appears to modify the base term 322 in the domain-specific corpus 314 (e.g., "expensive cholesterol medicine"). The lexical analyzer 108 may determine that the co-occurrence statistics 380 indicate that the particular term (e.g., "expensive") appears to modify the base term 322 (e.g., "cholesterol") a particular number of times. The lexical analyzer 108 may, in response to determining that the particular number of times fails to satisfy the threshold (e.g., 20), refrain from designating the particular term (e.g., "expensive") as a modifier term of the base term 322. In a particular aspect, the lexical analyzer 108 may determine that another base term (e.g., medicine) is subsequent to the base term 322 in the domain-specific corpus 314 (e.g., "expensive cholesterol medicine") and that the particular term (e.g., "expensive") appears to modify the other base term (e.g., medicine) a second number of times. The lexical analyzer 108 may, in response to determining that the particular number of times is less than the second number of times, refrain from designating the particular term (e.g., expensive) as a modifier term of the base term 322.

The lexical analyzer 108 may identify, based on the lexicon data 316, a part of speech of a modifier term, as described herein. The lexicon data 316 may indicate, for the modifier term, one or more adjectives 331, one or more prepositions 333, or a combination thereof. The lexical analyzer 108 may determine that the modifier term 334 (e.g., "high") corresponds to an adjective in response to determining that the adjectives 331 include the modifier term 334 (e.g., "high"). The lexical analyzer 108 may determine that the modifier term 344 (e.g., "in") corresponds to a preposition in response to determining that the prepositions 333 include the modifier term 344 (e.g., "in"). The lexical analyzer 108 may determine that the modifier term 324 (e.g., "blood") corresponds to a noun in response to determining that the modifier term 324 (e.g., "blood") is indicated as a particular base term in the lexicon data 316 and that the lexicon data 316 indicates that the part of speech of the particular base term is a noun.

The lexical analyzer 108 may, in response to determining that the modifier term 334 (e.g., "high") corresponds to a particular part of speech (e.g., adjective), determine that modifier term 334 (e.g., "high") corresponds to a first modifier type (e.g., an adjectival modifier term). The lexical analyzer 108 may, in response to determining that the modifier term 334 (e.g., "high") occurred next to and prior to the base term 322, determine that the modifier term 334 corresponds to a second modifier type (e.g., a pre-modifier term). The lexical analyzer 108 may generate (or update) the non-core data 340 to indicate that the modifier term 334 (e.g., "high") is a domain-specific modifier of the base term 322 of a type that indicates the first modifier type (e.g., adjectival modifier term), the second modifier type (e.g., pre-modifier term), or both (e.g., adjectival pre-modifier term). A particular domain-specific modifier of the base term 322 may be usable to modify the base term 322 in text associated with the domain 320.

The lexical analyzer 108 may generate the domain-specific information (e.g., the non-core data 340) of the lexicon data 316 during an offline training phase. For example, the lexical analyzer 108 may provide the domain-specific information (e.g., the non-core data 340) of the lexicon data 316 to the text parser 304 to train the domain-specific lexically-driven pre-parser 110. During the offline training phase, the lexical analyzer 108 may also generate the domain-specific parsing rules 370, as described herein. During a runtime phase, the domain-specific lexically-driven pre-parser 110 may process input text based on the domain-specific information of the lexicon data 316, the domain-specific parsing rules 370, or a combination thereof, to generate partially parsed and bracketed input text, as further described with reference to FIG. 4. A domain-independent rule-based parser may generate parsed text based on the partially parsed and bracketed input text, as further described with reference to FIG. 4.

Figure 7:
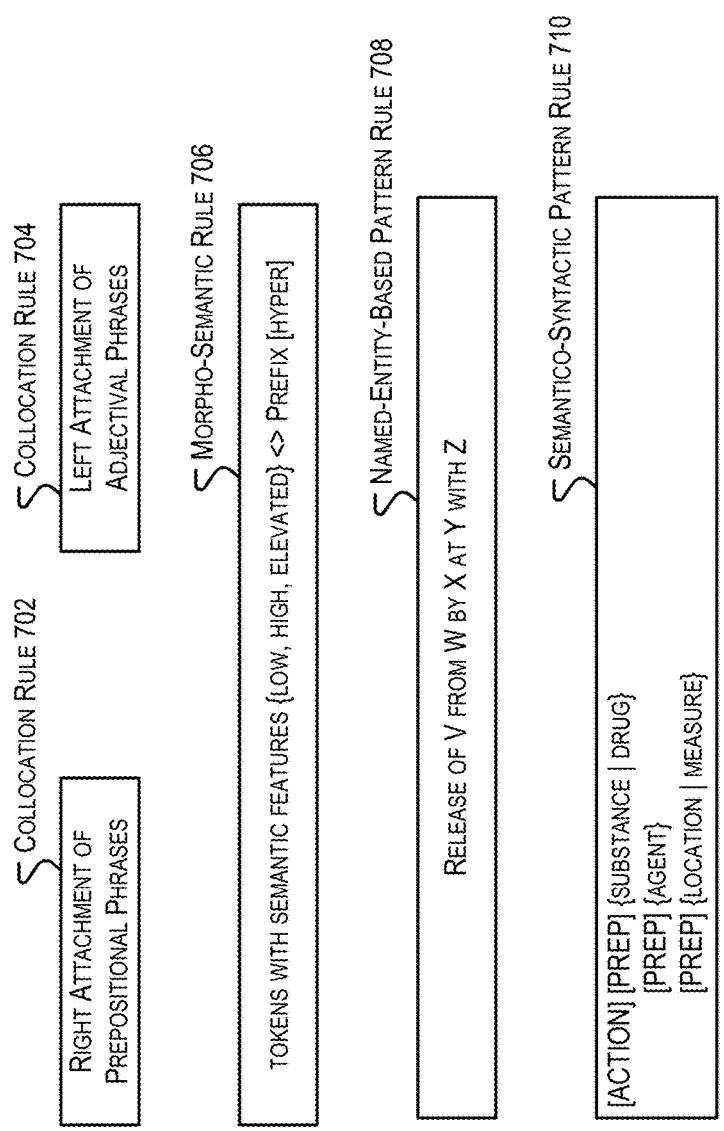
FIG. 7 illustrates examples of domain-specific parsing rules generated by the system of FIG. 3.

In a particular aspect, the lexical analyzer 108 may generate a first collocation rule (e.g., left attachment of adjectival phrases) based at least in part on determining that the modifier term 334 occurred next to and prior to the base term 322 in the domain-specific corpus 314, as further described with respect to FIG. 7. The domain-specific parsing rules 370 may include the first collocation rule. The domain-specific parsing rules 370 are associated with the domain 320.

The lexical analyzer 108 may, in response to determining that the modifier term 344 (e.g., "in") corresponds to a particular part of speech (e.g., preposition), generate (or update) the non-core data 340 to indicate that the modifier term 344 (e.g., "in") is a domain-specific modifier of the base term 322 corresponding to the particular part of speech (e.g., a preposition modifier term). The lexical analyzer 108 may generate a second collocation rule (e.g., right attachment of prepositional phrases) based at least in part on determining that the modifier term 344 occurred next to and subsequent to the base term 322 in the domain-specific corpus 314, as further described with respect to FIG. 7. The domain-specific parsing rules 370 may include the second collocation rule.

The lexical analyzer 108 may, in response to determining that the modifier term 324 (e.g., "blood") corresponds to a particular part of speech (e.g., noun), determine that the modifier term 324 corresponds to a first modifier type (e.g., a nominal modifier term). The lexical analyzer 108 may, in response to determining that the modifier term 324 (e.g., "blood") occurred next to and prior to the base term 322, determine that the modifier term 324 corresponds to a second modifier type (e.g., a pre-modifier term). The lexical analyzer 108 may generate (or update) the non-core data 340 to indicate that the modifier term 324 (e.g., "blood") is a domain-specific modifier of the base term 322 of a type that indicates the first modifier type (e.g., a nominal modifier term), the second modifier type (e.g., a pre-modifier term), or both (e.g., a nominal pre-modifier term). The lexical analyzer 108 may generate a third collocation rule (e.g., left attachment of nominal pre-modifier terms) based at least in part on determining that the modifier term 324 occurred next to and prior to the base term 322 in the domain-specific corpus 314, as further described with respect to FIG. 7. The domain-specific parsing rules 370 may include the third collocation rule.

In a particular aspect, a modifier type (e.g., a pre-modifier term or a post-modifier term) of a modifier term may indicate a collocation rule. For example, a modifier term (e.g., "high") of a first modifier type (e.g., a pre-modifier term) may indicate a first collocation rule (e.g., left attachment). The lexical analyzer 108 may generate (or update) the domain-specific parsing rules 370 to include one or more rules based on the domain-specific corpus 314, as further described with reference to FIG. 7.

In a particular aspect, the lexical analyzer 108 may display proposed updates to a display of the device 302. The proposed updates may indicate updates to the lexicon data 316, the domain-specific parsing rules 370, or a combination thereof. The user 301 may provide the user input 382 to the device 302 indicating edits to the proposed updates, approval of the proposed updates, or rejection of the proposed updates. The lexical analyzer 108 may, in response to determining that the user input 382 indicates edits or approval of the proposed updates, update the lexicon data 316, the domain-specific parsing rules 370, or a combination thereof. The lexical analyzer 108 may thus enable the user 301 to monitor updates to the lexicon data 316, the domain-specific parsing rules 370, or a combination thereof. Alternatively, the lexical analyzer 108 may, in response to determining that the user input 382 indicates that the proposed updates are rejected, refrain from updating the lexicon data 316 and refrain from updating the domain-specific parsing rules 370.

In a particular aspect, the lexical analyzer 108 may generate (or update) the lexicon data 316 based on the user input 382. For example, the user 301 may provide the user input 382 to the device 302. The user input 382 may indicate that a term (e.g., "extremity") is to be added to the lexicon data 316 as a base term. The user input 382 may indicate domain-independent information associated with the term (e.g., "extremity"). For example, the user input 382 may indicate a part of speech (e.g., noun), one or more semantic types (e.g., bodypart, point, limit, and state), or a combination thereof, of the term (e.g., "extremity"). The lexical analyzer 108 may, in response to receiving the user input 382, generate (or update) the lexicon data 316 to include an entry indicating the term (e.g., "extremity") as a base term.

In a particular aspect, the lexical analyzer 108 may generate (or update) the non-core data 340 based on the user input 382. For example, the user 301 may provide the user input 382 to the device 302. The user input 382 may indicate that a term (e.g., "elevated") is to be added to the non-core data 340 as a modifier of the base term 322 (e.g., "cholesterol"). The user input 382 may indicate a part of speech of the modifier (e.g., adjective). The lexical analyzer 108 may, in response to receiving the user input 382, generate (or update) the non-core data 340 to indicate that a modifier term (e.g., "elevated") is a domain-specific modifier of the base term 322 corresponding to the part of speech (e.g., an adjectival modifier term). The lexical analyzer 108 may thus enable the user 301 to manually add a modifier term to the non-core data 340 independently of the domain-specific corpus 314.

In a particular aspect, the non-core data 340 is based on the domain-specific corpus 314 and the user input 382. For example, the non-core data 340 may include a term (e.g., "elevated") based on the user input 382, and may include the modifier term 324, the modifier term 334, and the modifier term 344 based on the domain-specific corpus 314.

In a particular aspect, the lexical analyzer 108 may generate (or update) the domain-specific parsing rules 370 based on the user input 382. For example, the user 301 may provide the user input 382 to the device 302. The user input 382 may indicate that a rule (e.g., a collocation rule, a morpho-semantic rule, a named-entity-based pattern rule, a semantico-syntactic pattern rule, or another rule) is to be added to the domain-specific parsing rules 370, as further described with reference to FIG. 7. The lexical analyzer 108 may, in response to receiving the user input 382, generate (or update) the domain-specific parsing rules 370 to include the user-specified rule. The lexical analyzer 108 may thus enable the user 301 to manually add a rule to the domain-specific parsing rules 370 independently of the domain-specific corpus 314.

In a particular aspect, the domain-specific parsing rules 370 are based on the domain-specific corpus 314 and the user input 382. For example, the domain-specific parsing rules 370 may include a semantico-syntactic pattern rule based on the user input 382 and may include a first collocation rule (e.g., right attachment of prepositional phrases) and a second collocation rule (e.g., left attachment of adjective phrases) based on the domain-specific corpus 314, as further described with reference to FIG. 7.

The non-core data 340 is associated with the domain 320. For example, the non-core data 340 may indicate the domain 320. In a particular aspect, the entry 318 may include additional non-core data associated with one or more additional domains that are distinct from the domain 320. For example, the domain 320 corresponds to one of medicine, engineering, art, music, finance, oil & gas, English, French, Spanish, Java® (registered trademark of Oracle, Inc., Redwood Shores, Calif.), Python® (registered trademark of Python Software Foundation, Delaware), or a combination thereof, and a second domain corresponds to another of medicine, engineering, art, music, finance, oil & gas, English, French, Spanish, Java® (registered trademark of Oracle, Inc., Redwood Shores, Calif.), Python® (registered trademark of Python Software Foundation, Delaware), or a combination thereof. The lexical analyzer 108 may generate the additional non-core data based on analyzing a second domain-specific corpus associated with the second domain. The additional non-core data may indicate one or more modifier terms as one or more additional domain-specific modifiers of the base term 322 (e.g., "cholesterol") that are valid in the second domain.

In a particular aspect, the lexical analyzer 108 may, based on the user input 382, the co-occurrence statistics 380, or both, identify a modifier term as a preferred domain-specific modifier of a base term in the lexicon data 316. For example, the user 301 may provide the user input 382 indicating that the modifier term 324 (e.g., "blood") is a preferred domain-specific modifier term of the base term 322 (e.g., "cholesterol"). The lexical analyzer 108 may, in response to receiving the user input 382, determine that the modifier term 324 is a preferred domain-specific modifier term of the base term 322. In another aspect, the lexical analyzer 108 may, in response to determining that the first number of times that the modifier term 324 (e.g., "blood") appears to modify the base term 322 (e.g., "cholesterol") satisfies (e.g., is greater than) a preference threshold, determine that the modifier term 324 is a preferred domain-specific modifier term of the base term 322. The lexical analyzer 108 may, in response to determining that the modifier term 324 is a preferred domain-specific modifier term, generate (or update) the non-core data 340 to indicate that the modifier term 324 is a preferred domain-specific modifier term.

The lexical analyzer 108 may provide the domain-specific parsing rules 370 to the domain-specific lexically-driven pre-parser 110. The text parser 304 may parse text based on the domain-specific parsing rules 370, the lexicon data 316, or a combination thereof, as further described with reference to FIG. 4. In a particular aspect, the device 302 may provide the domain-specific parsing rules 370, the lexicon data 316, or a combination thereof, to one or more other devices. For example, the device 302 may provide the domain-specific parsing rules 370, the lexicon data 316, or a combination thereof, to one of the cloud computing nodes 10 or one of the computing devices 54A-N. The other device may include a parser (e.g., the text parser 304) configured to parse input text based on the domain-specific parsing rules 370, the lexicon data 316, or a combination thereof.

The system 300 enables generation (or update) of the lexicon data 316 (e.g., the non-core data 340), the domain-specific parsing rules 370, or a combination thereof, based on the user input 182, the domain-specific corpus 314, or both. For example, large texts may be analyzed automatically (or partially automatically) by the lexical analyzer 108 to efficiently update (e.g., train) the lexicon data 316, the domain-specific parsing rules 370, or a combination thereof. Automatic (or at least partially automatic) generation (or update) of the lexicon data 316, the domain-specific parsing rules 370, or a combination thereof, may increase efficiency, robustness, and coverage, as compared to manual generation (or update) of the lexicon data 316, the domain-specific parsing rules 370, or both.

Figure 4:
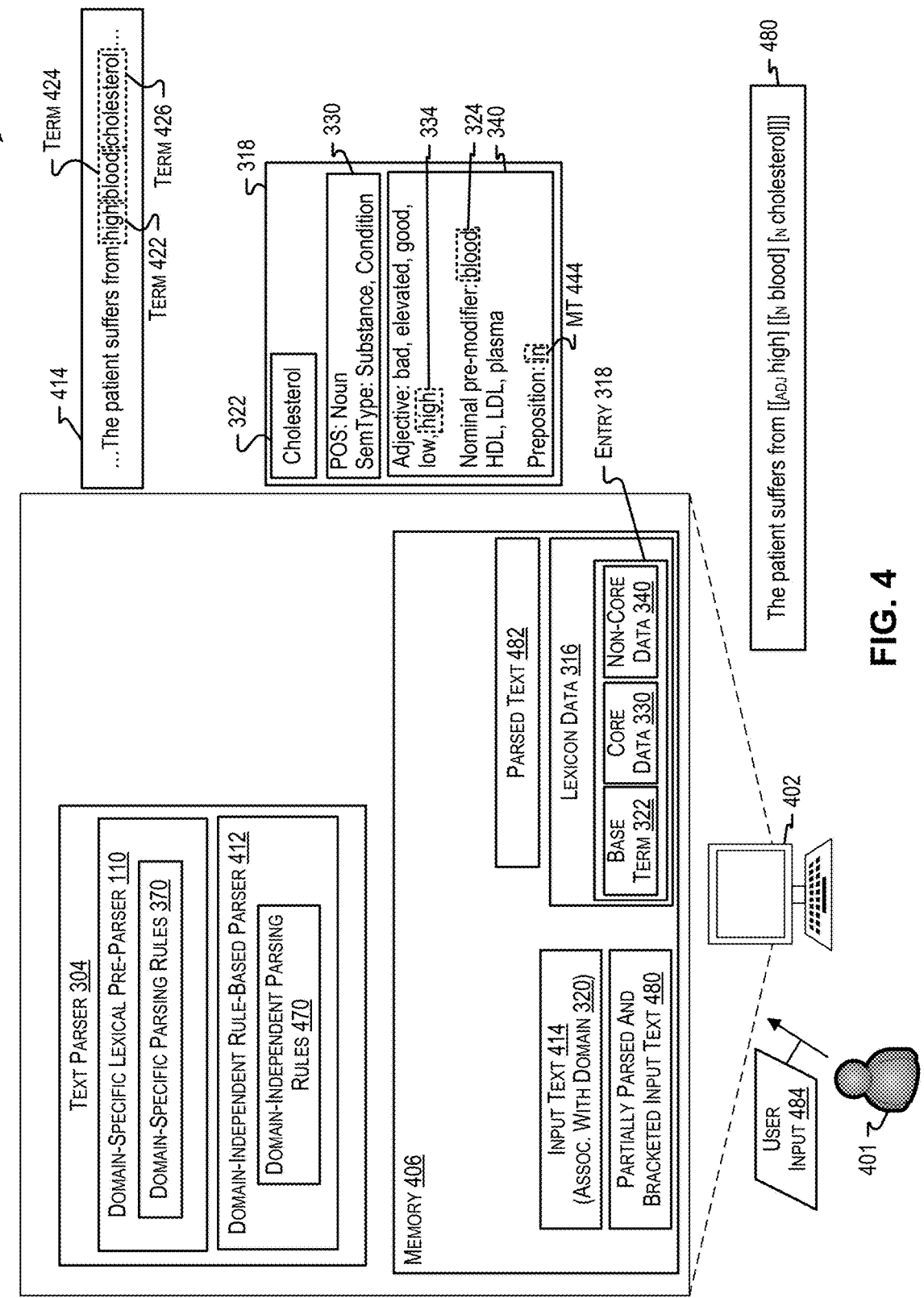
FIG. 4 illustrates a system for lexically-guided parsing.

FIG. 4 illustrates a system 400 for performing lexically-driven parsing. The system 400 includes a device 402. The device 402 may include a processor, a computer, a laptop computer, a server, a communication device, an entertainment device, or a combination thereof. The device 402 may be the same as or distinct from the device 302 of FIG. 3.

The device 402 includes (or accesses) the domain-specific lexically-driven pre-parser 110. For example, the device 402 includes (or accesses) the text parser 304. The text parser 304 includes the domain-specific lexically-driven pre-parser 110 and a domain-independent rule-based parser 412. The domain-independent rule-based parser 412 is configured to perform domain-independent parsing based on the domain-independent parsing rules 470. The domain-independent parsing rules 470 may be previously generated at the device 402, received by the device 402 from a user, received by the device 402 from another device, or a combination thereof.

In a particular aspect, the device 402 may correspond to one or more of the cloud computing nodes 10 of FIG. 1. For example, the device 402 may provide the domain-specific lexically-driven pre-parser 110 (e.g., software corresponding to the domain-specific lexically-driven pre-parser 110) or functions of the domain-specific lexically-driven pre-parser 110 as a service. In an alternate aspect, the device 402 may correspond to a cloud consumer device, such as, for example, the personal digital assistant (PDA) or cellular telephone 54A, the desktop computer 54B, the laptop computer 54C, the automobile computer system 54N of FIG. 1, or a combination thereof. The device 402 may receive the domain-specific lexically-driven pre-parser 110 (e.g., software corresponding to the domain-specific lexically-driven pre-parser 110) or access functions of the domain-specific lexically-driven pre-parser 110 as a service provided by one or more of the cloud computing nodes 10 of FIG. 1.

The device 402 may include a memory 406. The memory 406 is configured to store the lexicon data 316. In a particular aspect, the device 402 may receive the lexicon data 316, the domain-specific parsing rules 370, or a combination thereof, from another device, such as the device 302 of FIG. 3. The device 402 may store the lexicon data 316 in the memory 406.

During operation, the text parser 304 may determine that input text 414 is to be analyzed. For example, the text parser 304 may receive a user input 484 from a user 401 or a request from another device indicating that the input text 414 is to be analyzed. The user 401 may be the same as or distinct from the user 301 of FIG. 3. The text parser 304 may determine that the input text 414 is associated with the domain 320. For example, the text parser 304 may determine that the input text 414 indicates the domain 320. To illustrate, a first line of the input text 414 may include an identifier (e.g., "# medicine") of the domain 320. In an alternate aspect, the text parser 304 may receive the user input 484 or data from another device indicating that the input text 414 is associated with the domain 320. For example, the user input 484 (or the data) may include an identifier of the input text 414 (e.g., a file identifier) and an identifier (e.g., "# medicine") of the domain 320.

The text parser 304 may provide the input text 414 to the domain-specific lexically-driven pre-parser 110 in response to determining that the input text 414 is associated with the domain 320. The domain-specific lexically-driven pre-parser 110 may generate partially parsed and bracketed input text 480 by processing the input text 414 based on the domain-specific parsing rules 370. For example, the input text 414 may include a sentence (e.g., "The patient suffers from high blood cholesterol"). In a particular aspect, the domain-specific lexically-driven pre-parser 110 may copy the sentence to generate an initial version (e.g., "The patient suffers from high blood cholesterol") of the partially parsed and bracketed input text 480. The domain-specific lexically-driven pre-parser 110 may update the partially parsed and bracketed input text 480 at various stages of processing. For example, at a particular stage of processing, the domain-specific lexically-driven pre-parser 110 may generate a next version of the partially parsed and bracketed input text 480 by adding one or more phrase markers to a previous version of the partially parsed and bracketed input text 480, as described herein. The domain-specific lexically-driven pre-parser 110, in response to determining that the pre-parsing of the input text 414 is complete, provides the most recently generated version (e.g., "The patient suffers from [[$_{ADJ}$high] [$_N$ blood] [$_N$ cholesterol]]]") of the partially parsed and bracketed input text 480 to the domain-independent rule-based parser 412, as described herein.

The domain-specific lexically-driven pre-parser 110 may identify terms (e.g., words) in the input text 414. For example, the domain-specific lexically-driven pre-parser 110 may determine that the input text 414 includes a term (e.g., "The"), a term (e.g., "patient"), a term (e.g., "suffers"), a term (e.g., "from"), a term 422 (e.g., "high"), a term 424 (e.g., "blood"), and a term 426 (e.g., "cholesterol").

The domain-specific lexically-driven pre-parser 110 may determine that the term 426 (e.g., cholesterol) is indicated as the base term 322 in the entry 318 of the lexicon data 316. The domain-specific lexically-driven pre-parser 110 may, in response to determining that the core data 330 indicates a part of speech (e.g., noun) of the base term 322, update the partially parsed and bracketed input text 480 (e.g., "The patient suffers from high blood cholesterol") to indicate the part of speech of the term 426 corresponding to the base term 322. For example, the domain-specific lexically-driven pre-parser 110 may add a phrase marker (e.g., [$_N$]) around the term 426 (e.g., cholesterol) in the partially parsed and bracketed input text 480 (e.g., "The patient suffers from high blood [$_N$ cholesterol]") to indicate the part of speech (e.g., noun).

The domain-specific lexically-driven pre-parser 110 may determine that the term 424 (e.g., blood) is a potential modifier term of the term 426 (e.g., cholesterol) in response to determining that the term 424 appears to modify (e.g., is next to) the term 426 in the input text 414. The domain-specific lexically-driven pre-parser 110 may compare a potential modifier term (e.g., the term 424) to modifier terms indicated in the non-core data 340. The domain-specific lexically-driven pre-parser 110 may determine that the term 424 (e.g., blood) is indicated as the modifier term 324 (e.g., nominal pre-modifier term) in the non-core data 340.

The domain-specific lexically-driven pre-parser 110 may determine whether the modifier term 324 is associated with a collocation rule. For example, the domain-specific lexically-driven pre-parser 110 may determine whether the modifier term 324 is of a modifier type that indicates a collocation rule. A pre-modifier term may indicate a first collocation rule (e.g., left attachment). A post-modifier term may indicate a second collocation rule (e.g., right attachment). The domain-specific lexically-driven pre-parser 110 may determine that the modifier term 324 is associated with a particular collocation rule (e.g., left attachment) in response to determining that the modifier term 324 is of a modifier type (e.g., a pre-modifier term) that indicates the particular collocation rule. Alternatively, or in addition, the domain-specific lexically-driven pre-parser 110 may determine that the modifier term 324 is associated with the particular collocation rule in response to determining that the domain-specific parsing rules 370 indicate that the modifier type (e.g., a pre-modifier term) is associated with the particular collocation rule (e.g., left attachment of pre-modifier terms).

The domain-specific lexically-driven pre-parser 110 may, in response to determining that the modifier term 324 is associated with a particular collocation rule (e.g., left attachment), determine whether a position of the term 424 (e.g., blood) relative to the term 426 (e.g., cholesterol) in the input text 414 satisfies the particular collocation rule (e.g., left attachment). For example, the domain-specific lexically-driven pre-parser 110 may, in response to determining that the term 424 (e.g., blood) is prior to (e.g., on the left of) the term 426 (e.g., cholesterol) in the input text 414, determine that the term 424 (e.g., blood) satisfies the first collocation rule (e.g., left attachment) associated with the modifier term 324 (e.g., nominal pre-modifier term). The domain-specific lexically-driven pre-parser 110 may, in response to determining that the term 424 (e.g., blood) satisfies the collocation rule (e.g., left attachment) associated with the modifier term 324, update the partially parsed and bracketed input text 480 (e.g., "The patient suffers from high [[$_N$ blood] [$_N$ cholesterol]]") by adding a phrase marker (e.g., [$_N$]) around the term 424 and by bracketing (e.g., grouping) the term 424 (e.g., blood) with the term 426 (e.g., cholesterol). The phrase marker (e.g., [$_N$]) around the term 424 may indicate a part of speech (e.g., noun) corresponding to the modifier type (e.g., nominal modifier term) of the modifier term 324 (e.g., blood).

The domain-specific lexically-driven pre-parser 110 may determine that the term 422 (e.g., high) is a potential modifier term of the term 426 (e.g., cholesterol) in response to determining that the term 422 appears to modify the term 426 in the input text 414. For example, the domain-specific lexically-driven pre-parser 110 may determine that the term 422 appears to modify the term 426 in response to determining that the term 422 is next to the term 424 that is bracketed (e.g., grouped) with the term 426 in the partially parsed and bracketed input text 480 (e.g., "The patient suffers from high [[$_N$ blood] [$_N$ cholesterol]]".

The domain-specific lexically-driven pre-parser 110 may compare a potential modifier term (e.g., the term 422) to modifier terms indicated by the non-core data 340. The domain-specific lexically-driven pre-parser 110 may determine that the term 422 (e.g., high) is indicated as the modifier term 334 (e.g., adjectival modifier term) in the non-core data 340.

The domain-specific lexically-driven pre-parser 110 may determine whether the modifier term 334 is associated with a collocation rule. For example, the domain-specific lexically-driven pre-parser 110 may, in response to determining that the non-core data 340 is silent regarding (e.g., does not indicate) whether the modifier term 334 is a pre-modifier term or a post-modifier term, determine whether the domain-specific parsing rules 370 indicate a collocation rule associated with a modifier type (e.g., adjectival modifier term) of the modifier term 334 (e.g., high). To illustrate, the domain-specific lexically-driven pre-parser 110 may determine that the modifier term 334 (e.g., high) is associated with a particular collocation rule (e.g., left attachment) in response to determining that the domain-specific parsing rules 370 indicate that the modifier type (e.g., adjectival modifier term) is associated with the particular collocation rule. Alternatively, the domain-specific lexically-driven pre-parser 110 may, in response to determining that neither the non-core data 340 nor the domain-specific parsing rules 370 indicate a collocation rule associated with the modifier term 334 (e.g., high), determine that a default collocation rule (e.g., left attachment) is associated with the modifier term 334.

The domain-specific lexically-driven pre-parser 110 may, in response to determining that the modifier term 334 (e.g., high) is associated with a particular collocation rule (e.g., left attachment), determine whether a position of the term 422 (e.g., high) relative to the term (e.g., cholesterol) in the input text 414 satisfies the particular collocation rule. For example, the domain-specific lexically-driven pre-parser 110 may, in response to determining that the term 422 (e.g., high) is prior to (e.g., on the left of) the term 426 (e.g., cholesterol) in the input text 414, the partially parsed and bracketed input text 480, or both.

In a particular aspect, the domain-specific lexically-driven pre-parser 110 may determine that a first term satisfies a first collocation rule (e.g., left attachment) relative to the term 426 in response to determining that the first term is prior to (or on the left) of a second term that is bracketed (i.e., grouped) with the term 426 in the partially parsed and bracketed input text 480. For example, the domain-specific lexically-driven pre-parser 110 may determine that the term 422 (e.g., high) satisfies the first collocation rule (e.g., left attachment) in response to determining that the term 422 (e.g., high) occurs prior to (e.g., on the left of) the term 424 (e.g., blood) that is bracketed with the term 426 (e.g., cholesterol) in the partially parsed and bracketed input text 480 (e.g., "The patient suffers from high [[$_N$ blood] [$_N$ cholesterol]]").

The domain-specific lexically-driven pre-parser 110 may, in response to determining that the term 422 (e.g., high) satisfies the first collocation rule (e.g., left attachment), update the partially parsed and bracketed input text 480 (e.g., "The patient suffers from [[$_{ADJ}$ high] [[$_N$ blood] [$_N$ cholesterol]]]") adding a phrase marker (e.g., [$_{ADJ}$]) and by bracketing (e.g., grouping) the term 422 (e.g., high) with the bracketed (i.e., grouped) terms including the term 426 (e.g., cholesterol).

In a particular aspect, the domain-specific lexically-driven pre-parser 110 may determine that a term (e.g., from) is a potential modifier term of the term 426 (e.g., cholesterol) in response to determining that the term (e.g., from) appears to modify the term 426 in the input text 414. For example, the domain-specific lexically-driven pre-parser 110 may determine that the term (e.g., from) appears to modify the term 426 in response to determining that the term (e.g., from) is next to the term 422 (e.g., high) that is bracketed (e.g., grouped) with the term 426 in the partially parsed and bracketed input text 480 (e.g., "The patient suffers from [[$_{ADJ}$ high] [[$_N$ blood] [$_N$ cholesterol]]]"). A "potential modifier term" may or may not be a modifier term of the term 426. As used herein, a "potential modifier term" of the term 426 includes a term that is syntactically linked to the term 426. The domain-specific lexically-driven pre-parser 110 may determine that the term (e.g., from) is syntactically linked to the term 422 (e.g., high) in response to determining that the term (e.g., from) is next to the term 422 (e.g., high) that is bracketed (e.g., grouped) with the term 426 in the partially parsed and bracketed input text 480 (e.g., "The patient suffers from [[$_{ADJ}$ high] [[$_N$ blood] [$_N$ cholesterol]]]").

The domain-specific lexically-driven pre-parser 110 may determine whether the potential modifier term (e.g., from) is in fact a modifier term of the term 426. For example, the domain-specific lexically-driven pre-parser 110 may compare the potential modifier term (e.g., from) to modifier terms indicated by the non-core data 340. The domain-specific lexically-driven pre-parser 110 may, in response to determining that the potential modifier term (e.g., from) is not indicated as a modifier term by the non-core data 340, determine that the input text 414 does not include any additional domain-specific modifier terms of the base term 322 that are prior to the term 426.

The domain-specific lexically-driven pre-parser 110 may, in response to determining that the input text 414 does not include any additional domain-specific modifier terms prior to the term 426, determine whether the input text 414 includes potential modifier terms subsequent to the term 426. The domain-specific lexically-driven pre-parser 110 may, in response to determining that the input text 414 does not include any additional domain-specific modifier terms prior to the term 426 or subsequent to the term 426, determine that there is no additional modifier term associated with the term 426 to be identified.

The domain-specific lexically-driven pre-parser 110 may, in response to determining that there are no additional modifier terms to be identified for the term 426, determine whether the input text 414 includes another term that is indicated as a base term by the lexicon data 316. The domain-specific lexically-driven pre-parser 110 may, in response to determining that the input text 414 includes another term that is indicated as a base term, determine modifier terms of the other term in the input text 414, as described herein. Alternatively, the domain-specific lexically-driven pre-parser 110, in response to determining that the input text 414 does not include another term that is indicated as a base term by the lexicon data 316, may determine that pre-parsing of the input text 414 is complete.

In a particular aspect, the domain-specific lexically-driven pre-parser 110 may generate (or update) the partially parsed and bracketed input text 480 in response to determining that the input text 414 satisfies at least one of a morpho-semantic rule, a named-entity-based pattern rule, or a semantico-syntactic pattern rule of the domain-specific parsing rules 370, as further described with reference to FIG. 8. The domain-specific lexically-driven pre-parser 110 may determine that the pre-parsing of the input text 414 is complete in response to determining that no additional rules (or none) of the domain-specific parsing rules 370 are applicable to the partially parsed and bracketed input text 480.

It should be understood that iteratively updating the partially parsed and bracketed input text 480 is described as an illustrative, non-limiting, example. In an alternative aspect, the domain-specific lexically-driven pre-parser 110 copies the sentence of the input text 414 to the memory 406 as an initial version (e.g., "The patient suffers from high blood cholesterol") of processing data. The domain-specific lexically-driven pre-parser 110 updates the processing data at various stages of processing. For example, the domain-specific lexically-driven pre-parser 110 generates a next version of the processing data by adding, based on the lexicon data 316 and the domain-specific parsing rules 370, one or more phrase markers to a previous version of the processing data. In this aspect, the domain-specific lexically driven pre-parser 110, in response to determining that pre-parsing of the input text 414 is complete, designates the most recently generated version (e.g., "The patient suffers from [[$_{ADJ}$ high] [[$_N$ blood] [$_N$ cholesterol]]]") of the processing data as the partially parsed and bracketed input text 480.

The partially parsed and bracketed input text 480 may be prepared for processing (e.g., parsing) by the domain-independent rule-based parser 412. The domain-specific lexically-driven pre-parser 110 may, in response to determining that the pre-parsing of the input text 414 is complete, provide the partially parsed and bracketed input text 480 (e.g., "The patient suffers from [[$_{ADJ}$ high] [[$_N$ blood] [$_N$ cholesterol]]]") to the domain-independent rule-based parser 412.

The domain-independent rule-based parser 412 may process the partially parsed and bracketed input text 480 (e.g., "The patient suffers from [[$_{ADJ}$ high] [[$_N$ blood] [$_N$ cholesterol]]]") based on the domain-independent parsing rules 470 to generate parsed text 482, as further described with reference to FIG. 5. The parsed text 482 may be associated with the domain 320. The domain-independent rule-based parser 412 may provide a message to a display of the device 402 that the input text 414 has been successfully parsed based at least in part on the domain-specific parsing rules 370 associated with the domain 320. For example, the message may indicate that the input text 414 has been parsed by the domain-independent rule-based parser 412 using the domain-specific parsing rules 370.

The domain-independent parsing rules 470 may be maintained (e.g., updated) independently of the domain-specific parsing rules 370. The domain-independent rule-based parser 412 may be configured to receive partially parsed and bracketed text from multiple domain-specific lexically-driven pre-parsers. For example, the domain-independent rule-based parser 412 may be configured to receive the partially parsed and bracketed input text 480 generated by the domain-specific lexically-driven pre-parser 110 and to receive second partially parsed and bracketed text generated by a second domain-specific lexically-driven pre-parser. The domain 320 associated with the domain-specific lexically-driven pre-parser 110 may be distinct from a second domain associated with the second domain-specific lexically-driven pre-parser. In a particular aspect, a domain associated with the input text 414 may be unknown to the device 402. The text parser 304 may provide the input text 414 to multiple domain-specific lexically-driven pre-parsers (e.g., the domain-specific lexically-driven pre-parser 110 and the second domain-specific lexically-driven pre-parser 110). The text parser 304 may identify a domain associated with the input text 414 based on determining whether the partially parsed and bracketed input text 480, the second partially parsed and bracketed text, or both, are successfully parsed by the domain-independent rule-based parser 412. For example, the text parser 304 may determine that the input text 414 is likely associated with the domain 320, the second domain, or both, in response to determining that the partially parsed and bracketed input text 480, the second partially parsed and bracketed text, or both, respectively, are parsed successfully by the domain-independent rule-based parser 412.

In a particular aspect, the parsed text 482 may be processed by another component of the device 402 or by another device. For example, the input text 414 may correspond to doctor notes. A hospital record component (e.g., processor) of the device 402 may update patient-care records (e.g., a database) based on the parsed text 482, the user input 484, or both. As another example, the input text 414 may correspond to research papers. A research system (e.g., a processor) may update a research data based on the parsed text 482.

The system 400 enables parsing of the input text 414 based on the domain-specific parsing rules 370, the domain-independent parsing rules 470, or a combination thereof. Having distinct domain-specific parsing rules may improve performance. For example, specialized domains (e.g., the domain 320) may introduce syntactic patterns and may present with syntactic ambiguity types that are less common in the general domain. Pre-parsing input text of the specialized domains (e.g., the domain 320) based on the domain-specific parsing rules 370 may reduce (e.g., resolve) syntactic ambiguities prior to parsing based on the domain-independent parsing rules 470, thereby resulting in fewer (e.g., no) parsing errors.

Figure 5:
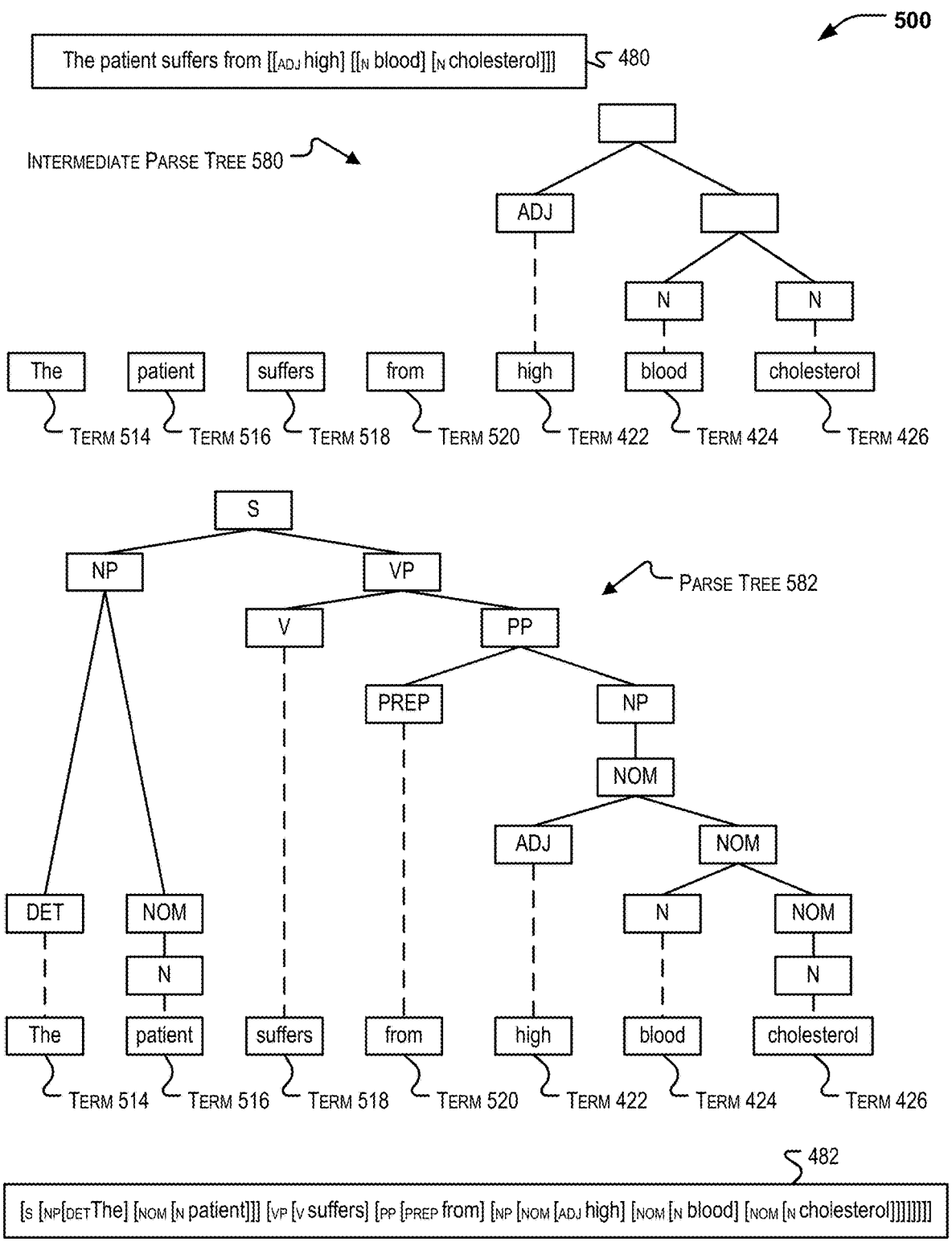
FIG. 5 illustrates example parse trees generated by the system of FIG. 3.

FIG. 5 illustrates an intermediate parse tree 580 and a parse tree 582. The intermediate parse tree 580 may be generated by the domain-specific lexically-driven pre-parser 110 of FIG. 1, the text parser 304 of FIG. 3, the device 402, the system 400 of FIG. 4, or a combination thereof. The intermediate parse tree 580 may correspond to (e.g., represent) the partially parsed and bracketed input text 480 (e.g., "The patient suffers from [[$_{ADJ}$ high] [[$_N$ blood] [$_N$ cholesterol]]]").

The parse tree 582 may be generated by the text parser 304 of FIG. 3, the domain-independent rule-based parser 412, the device 402, the system 400 of FIG. 4, or a combination thereof. For example, the domain-independent rule-based parser 412 may generate the parsed text 482 by parsing the partially parsed and bracketed input text 480 based on the domain-independent parsing rules 470, as described herein. The parse tree 582 may correspond to (e.g., represent) the parsed text 482.

The domain-independent parsing rules 470 may include the following rules:
S→NP VP
VP→V PP
PP→PREP NP
NP→DET NOM
NP→NOM
NOM→N
NOM→N NOM
NOM→ADJ NOM
DET→"The"
N→"patient"
V→"suffers"
PREP→"from"

where S corresponds to a sentence, NP corresponds to a noun phrase, VP corresponds to a verb phrase, V corresponds to a verb, PP corresponds to a prepositional phrase, PREP corresponds to a preposition, DET corresponds to a determiner, NOM corresponds to a nominal, N corresponds to a noun, and ADJ corresponds to an adjective.

The domain-independent rule-based parser 412 may generate the parsed text 482 by parsing the partially parsed and bracketed input text 480 (e.g., "The patient suffers from [[$_{ADJ}$ high] [[$_N$ blood] [$_N$ cholesterol]]]") based on the domain-independent parsing rules 470. For example, the domain-independent rule-based parser 412 may generate the parsed text 482 by copying the partially parsed and bracketed input text 480 (e.g., "The patient suffers from [[$_{ADJ}$ high] [[$_N$ blood] [$_N$ cholesterol]]]").

The domain-independent rule-based parser 412 may, subsequent to generating the parsed text 482 by copying the partially parsed and bracketed input text 480, update the parsed text 482 based on applying various rules of the domain-independent parsing rules 470. For example, the domain-independent rule-based parser 412 may, in response to determining that a term 514 (e.g., "The") of the partially parsed and bracketed input text 480 corresponds to a part of speech (e.g., DET) based on a rule (e.g., DET→"The") of the domain-independent parsing rules 470, update the parsed text 482 (e.g., "[$_{DET}$ The] patient suffers from [[$_{ADJ}$ high] [[$_N$ blood] [$_N$ cholesterol]]]") by adding a phrase marker (e.g., [$_{DET}$]) around the term 514 (e.g., "The"). The domain-independent rule-based parser 412 may continue applying various rules of the domain-independent parsing rules 470 to generate the parsed text 482 (e.g., "[$_s$ [$_{NP}$ [$_{DET}$ The] [$_{NOM}$ [$_N$ patient]]] [$_{VP}$ [$_V$ suffers] [$_{PP}$ [$_{PREP}$ from] [$_{NP}$ [$_{NOM}$ [$_{ADJ}$ high] [$_{NOM}$ [$_N$ blood] [$_{NOM}$ [$_N$ cholesterol]]]]]]]]"). The domain-independent rule-based parser 412 may determine that parsing of the partially parsed and bracketed input text 480 is successful in response to determining that the parsed text 482 includes a particular phrase marker (e.g., [$_s$]).

The input text 414 may include a syntactic ambiguity. For example, the term 422 (e.g., "high") may be a potential modifier of each of the term 424 (e.g., "blood") and the term 426 (e.g., "cholesterol"). The lexicon data 316 may indicate the term 426 (e.g., "cholesterol") as the base term 322 and the non-core data 340 may indicate the term 422 (e.g., "high") as the modifier term 334 of the base term 322. The lexicon data 316 may include a second entry indicating the term 424 as a second base term. The second entry may include second non-core data indicating one or more modifier terms of the second base term. The term 422 (e.g., "high") may be absent from the one or more modifier terms of the second base term (e.g., "blood"). The domain-specific lexically-driven pre-parser 110 may refrain from grouping the term 422 (e.g., "high") with the base term (e.g., "blood") in response to determining that the term 422 (e.g., "high") is absent from the one or more modifier terms of the second base term (e.g., "blood").

The domain-specific lexically-driven pre-parser 110 may group (e.g., bracket) the term 424 (e.g., "blood") and the term 426 (e.g., "cholesterol") to generate a first grouped term (e.g., "[blood cholesterol]"), and may group the term 422 (e.g., "high") with the first grouped term (e.g., "[blood cholesterol]") to generate a second grouped term (e.g., "[high [blood cholesterol]]"), as described with reference to FIG. 4. The second grouped term (e.g., "[high [blood cholesterol]]") of the partially parsed and bracketed input text 480 (e.g., "The patient suffers from [[$_{ADJ}$ high] [[$_N$ blood] [$_N$ cholesterol]]]") may resolve the syntactic ambiguity by indicating that the term 422 modifies the first grouped term (e.g., "[blood cholesterol]"). Consequently, the domain-independent rule-based parser 412 may have a higher likelihood of successfully parsing the partially parsed and bracketed input text 480.

Figure 6:
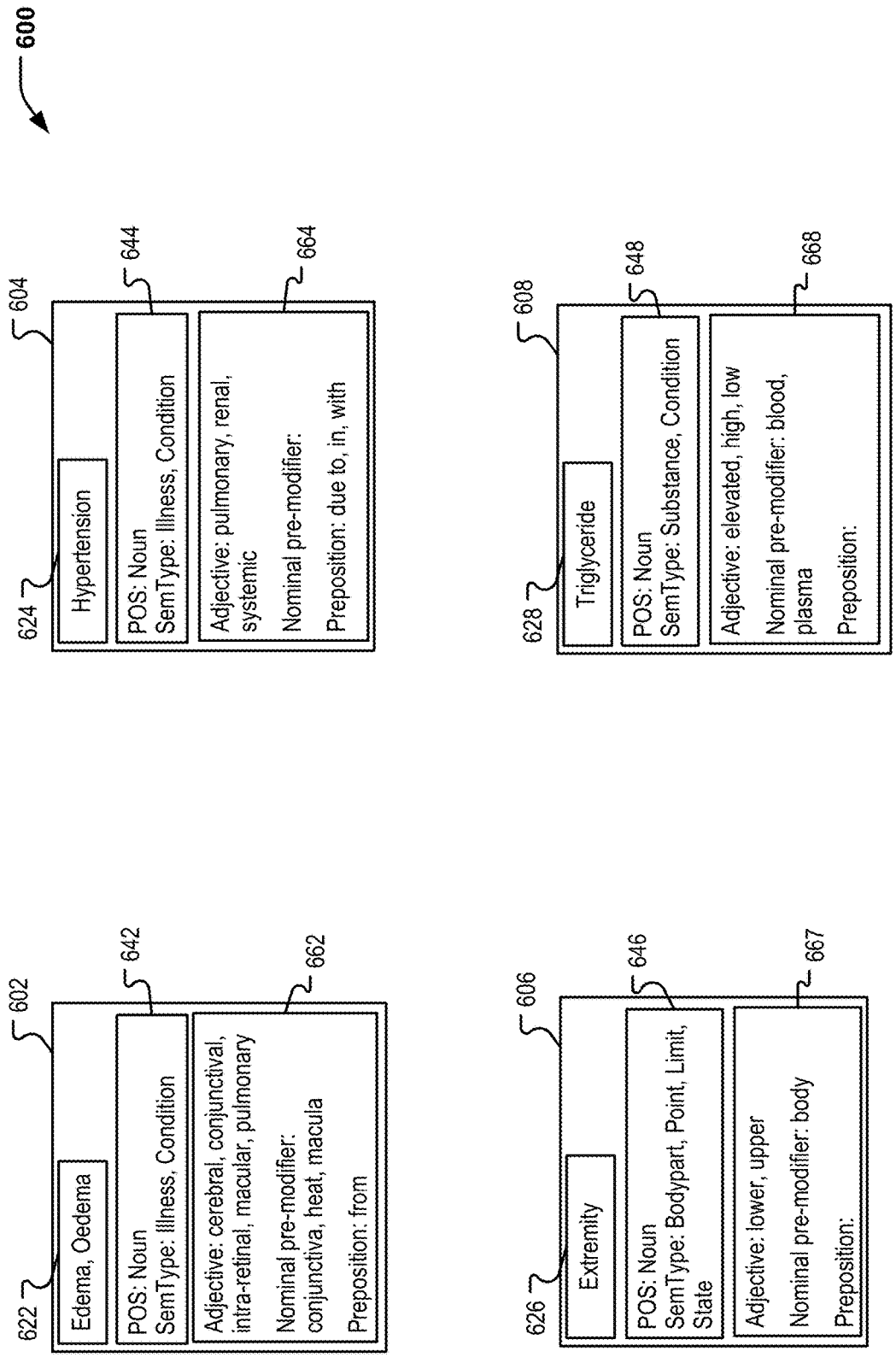
FIG. 6 illustrates a set of examples of lexicon data entries generated by the system of FIG. 3.

FIG. 6 illustrates entries 600 of the lexicon data 316 of FIG. 3. The entries 600 may be generated by the lexical analyzer 108 of FIG. 1, the device 302, the system 300 of FIG. 3, or a combination thereof.

The entries 600 may be associated with the domain 320 of FIG. 3. For example, the lexical analyzer 108 may generate (or update) the entries 600 based on analyzing the domain-specific corpus 314, as described with reference to FIG. 3. In a particular aspect, the entries 600 may be based on an analysis of multiple domain-specific texts (e.g., documents) associated with the domain 320. For example, the lexical analyzer 108 may generate (or update) some of the entries 600 based on analyzing a first domain-specific text of the domain-specific corpus 314 and some of the entries 600 based on analyzing another domain-specific text of the domain-specific corpus 314.

The entries 600 include an entry 602, an entry 604, an entry 606, and an entry 608. It should be understood that four entries are used herein as illustrative examples. The lexicon data 316 may include four entries, fewer than four entries, or more than four entries.

The entry 602 indicates a base term 622 (e.g., "edema, oedema"). The entry 602 includes alternative spellings of the base term 622. For example, base term 622 may have a first spelling (e.g., "edema") and a second spelling (e.g., "oedema"). Each of the alternative spellings may be valid in the domain 320. The entry 602 includes core data 642 and non-core data 662 associated with the base term 622. The core data 642 and the non-core data 662 indicate domain-independent and domain-specific information, respectively.

The entry 604 indicates a base term 624 (e.g., "hypertension"). The entry 604 includes core data 644 and non-core data 664 associated with the base term 624. The entry 606 indicates a base term 626 (e.g., "extremity"). The entry 606 includes core data 646 and non-core data 667 associated with the base term 626. The entry 608 indicates a base term 628 (e.g., "triglyceride"). The entry 608 includes core data 648 and non-core data 668 associated with the base term 628. The domain-specific lexically-driven pre-parser 110 may process input text based on one or more of the entries 602-608, as further described with reference to FIG. 8.

FIG. 7 illustrates examples of the domain-specific parsing rules 370. The domain-specific parsing rules 370 may be generated by the lexical analyzer 108 of FIG. 1, the device 302, the system 300 of FIG. 3, or a combination thereof. For example, the lexical analyzer 108 may generate the domain-specific parsing rules 370 based on the domain-specific corpus 314, the user input 382, or both, as described herein.

The domain-specific parsing rules 370 may include a collocation rule 702 (e.g., right attachment of prepositional phrases). The collocation rule 702 may indicate that a preposition modifier term subsequent to (e.g., on the right of) a corresponding base term is valid in the domain 320. The lexical analyzer 108 may generate the collocation rule 702 in response to determining that at least a threshold number of prepositional terms are detected subsequent to (e.g., on the right of) corresponding base terms in the domain-specific corpus 314. For example, the lexical analyzer 108 may generate the collocation rule 702 based at least in part on determining that the modifier term 344 (e.g., "in") of FIG. 3 is detected subsequent to (e.g., on the right of) the base term 322 (e.g., "cholesterol") in the domain-specific corpus 314. Alternatively, the lexical analyzer 108 may generate the collocation rule 702 in response to determining that the user input 382 indicates that a preposition modifier term subsequent to (e.g., on the right of) a corresponding base term is valid in the domain 320.

The domain-specific parsing rules 370 may include a collocation rule 704 (e.g., left attachment of adjectival phrases). The collocation rule 704 may indicate that an adjectival modifier term prior to (e.g., on the left of) a corresponding base term is valid in the domain 320. The lexical analyzer 108 may generate the collocation rule 704 in response to determining that at least a threshold number of adjectival terms are detected prior to (e.g., on the left of) corresponding base terms in the domain-specific corpus 314. For example, the lexical analyzer 108 may generate the collocation rule 704 based at least in part on determining that the modifier term 334 (e.g., "high") is detected prior to (e.g., on the left of) the base term 322 (e.g., "cholesterol") in the domain-specific corpus 314. Alternatively, the lexical analyzer 108 may generate the collocation rule 704 in response to determining that the user input 382 indicates that an adjectival modifier term prior to (e.g., on the left of) a corresponding base term is valid in the domain 320.

The domain-specific parsing rules 370 may include a morpho-semantic rule 706 (e.g., Tokens with semantic features {low, high, elevated}< >Prefix [HYPER]). The morpho-semantic rule 706 may indicate that terms having particular semantic features (e.g., low, high, elevated) are not valid modifier terms of a base term with a particular prefix (e.g., "hyper") in the domain 320.

In a particular aspect, the lexical analyzer 108 may generate the morpho-semantic rule 706 based on analyzing the domain-specific corpus 314. For example, the lexical analyzer 108 may determine that a first number (e.g., 0) of modifier terms having the particular semantic features are detected prior to (e.g., on the left of) corresponding base terms having the particular prefix (e.g., "hyper") in at least a portion of the domain-specific corpus 314. The lexical analyzer 108 may generate the morpho-semantic rule 706 in response to determining that the first number (e.g., 0) is less than or equal to a threshold. In a particular aspect, the lexical analyzer 108 may determine the first number (e.g., 0) of the modifier terms in response to determining that a configuration setting, the user input 382, data from another device, or a combination thereof, indicate that the relationship between the particular prefix and terms having the particular semantic features is to be evaluated. Alternatively, the lexical analyzer 108 may generate the morpho-semantic rule 706 in response to determining that the user input 382 indicates that terms having particular semantic features (e.g., low, high, elevated) are not valid modifier terms of a base term with a particular prefix (e.g., "hyper") in the domain 320.

The domain-specific parsing rules 370 may include a named-entity-based pattern rule 708 (e.g., "Release of V from W by X at Y with Z"). The named-entity-based pattern rule 708 may indicate a particular pattern of terms that includes one or more named-entities (e.g., V, W, X, Y, and Z). For example, a first named-entity (e.g., V) may correspond to a first semantic type (e.g., person_name), a second named-entity (e.g., W) may correspond to a second semantic type (e.g., department_name), a third named-entity (e.g., X) may correspond to a third semantic type (e.g., person_name), a fourth named-entity (Y) may correspond to a fourth semantic type (e.g., time), and a fifth named-entity (Z) may correspond to a fifth semantic type (e.g., person_name).

In a particular aspect, the lexical analyzer 108 may generate the named-entity-based pattern rule 708 based on analyzing the domain-specific corpus 314. For example, the lexical analyzer 108 may determine, based on named-entity-based pattern detection techniques, that the particular pattern occurs a first number of times (e.g., 5) in at least a portion of the domain-specific corpus 314. The lexical analyzer 108 may generate the named-entity-based pattern rule 708 in response to determining that the first number of times (e.g., 5) is greater than or equal to a threshold (e.g., 2). In a particular aspect, the lexical analyzer 108 may determine the first number of times (e.g., 5) in response to determining that a configuration setting, the user input 382, data from another device, or a combination thereof, indicate that named-entity-based pattern detection is to be performed. Alternatively, the lexical analyzer 108 may generate the named-entity-based pattern rule 708 in response to determining that the user input 382 indicates that the particular named-entity-based pattern (e.g., "Release of V from W by X at Y with Z") is valid in the domain 320.

The domain-specific parsing rules 370 may include a semantico-syntactic pattern rule 710 (e.g., [ACTION] [PREP] {substance drug} [PREP] {Agent} [PREP] {Location|Measure}). The semantico-syntactic pattern rule 710 may indicate a particular pattern of terms, where the pattern indicates phrase types and semantic types of one or more terms. For example, the semantico-syntactic pattern rule 710 (e.g., [ACTION] [PREP] {substance|drug} [PREP] {Agent} [PREP] {Location|Measure}) may indicate that an action phrase (e.g., "prescribing") followed by a first preposition (e.g., "of") followed by a first term (e.g., "acetaminophen") having a first semantic type (e.g., substance or drug) followed by a second preposition (e.g., "by") followed by a second term (e.g., person's name) having a second semantic type (e.g., agent) followed by a third preposition (e.g., "at" or "of") followed by a third term (e.g., "clinic" or "10 doses") having a third semantic type (e.g., location or measure) is valid in the domain 320.

In a particular aspect, the lexical analyzer 108 may generate the semantico-syntactic pattern rule 710 based on analyzing the domain-specific corpus 314. For example, the lexical analyzer 108 may determine, based on semantico-syntactic pattern detection techniques, that the particular pattern occurs a first number of times (e.g., 3) in at least a portion of the domain-specific corpus 314. The lexical analyzer 108 may generate the semantico-syntactic pattern rule 710 in response to determining that the first number of times (e.g., 3) is greater than or equal to a threshold (e.g., 2). In a particular aspect, the lexical analyzer 108 may determine the first number of times (e.g., 3) in response to determining that a configuration setting, the user input 382, data from another device, or a combination thereof, indicate that semantico-syntactic pattern detection is to be performed. Alternatively, the lexical analyzer 108 may generate the semantico-syntactic pattern rule 710 in response to determining that the user input 382 indicates that the particular semantico-syntactic pattern (e.g., [ACTION] [PREP] {substance|drug} [PREP] {Agent} [PREP] {Location|Measure}) is valid in the domain 320. The domain-specific lexically-driven pre-parser 110 may process input text based on one or more of the domain-specific parsing rules 370, as further described with reference to FIG. 8.

FIG. 8 illustrates examples 800 of input text and corresponding partially parsed and bracketed input text. The examples 800 include input text 802, input text 804, input text 806, and input text 810.

The domain-specific lexically-driven pre-parser 110 may generate partially parsed and bracketed input text 882 by processing the input text 802 (e.g., "The patient suffers from high cholesterol, triglycerides, and hypertension."), as described with reference to FIG. 4. The domain-specific lexically-driven pre-parser 110 may generate the partially parsed and bracketed input text 882 based at least in part on the entry 318 associated with the base term 322 (e.g., "cholesterol"), the entry 604 associated with the base term 624 (e.g., "hypertension"), the entry 608 associated with the base term 628 (e.g., "triglyceride"), the collocation rule 704, and the morpho-semantic rule 706 (e.g., Tokens with semantic features {low, high, elevated}< >Prefix [HYPER]), as described herein.

The domain-specific lexically-driven pre-parser 110 may determine that the modifier term 334 ("high") appears to modify the base term 322 (e.g., "cholesterol") in the input text 802. The domain-specific parsing rules 370 may include one or more list rules (e.g., LIST→LIST CONJ N, LIST→N COMMA LIST, LIST→N, where COMMA corresponds to "," and CONJ corresponds to "and"). The domain-specific lexically-driven pre-parser 110 may determine, based on the one or more list rules, that base term 322 (e.g., cholesterol) is included in a first list (e.g., "cholesterol, triglycerides, and hypertension"), a second list (e.g., "cholesterol, triglycerides"), and a third list (e.g., "cholesterol").

The domain-specific parsing rules 370 may determine, based on the collocation rule 704 (e.g., left attachment of adjectival phrases), that the modifier term 334 (e.g., "high") could be bracketed with the first list, the second list, or the third list, to generate first text (e.g., "The patient suffers from [high [cholesterol, triglycerides, and hypertension]]."), second text (e.g., "The patient suffers from [high [cholesterol, triglycerides]], and hypertension."), or third text (e.g., "The patient suffers from [high [cholesterol]], triglycerides, and hypertension."), respectively.

The domain-specific lexically-driven pre-parser 110 may resolve the ambiguity based on the entry 318 associated with the base term 322 (e.g., "cholesterol"), the entry 604 associated with the base term 624 (e.g., "hypertension"), the entry 608 associated with the base term 628 (e.g., "triglyceride"), and the morpho-semantic rule 706 (e.g., Tokens with semantic features {low, high, elevated}< >Prefix [HYPER]). For example, the domain-specific lexically-driven pre-parser 110 may determine that the morpho-semantic rule 706 (e.g., Tokens with semantic features {low, high, elevated}< >Prefix [HYPER]) indicates that terms having particular semantic features (e.g., low, high, elevated) are invalid modifier terms of a base term with a particular prefix (e.g., "hyper") in the domain 320. The domain-specific lexically-driven pre-parser 110 may determine that the first text (e.g., "The patient suffers from [high [cholesterol, triglycerides, and hypertension]].") is invalid in the domain 320 in response to determining that the base term 624 (e.g., "hypertension") has a particular prefix (e.g., "hyper") and that the modifier term 334 (e.g., "high") has a semantic feature (e.g., high) that is indicated as an invalid modifier term for base terms having the particular prefix.

The domain-specific lexically-driven pre-parser 110 may determine that the second text (e.g., "The patient suffers from [high [cholesterol, triglycerides]], and hypertension.") and the third text (e.g., "The patient suffers from [high [cholesterol]], triglycerides, and hypertension.") are valid in the domain 320 in response to determining that the non-core data 340 indicates the modifier term 334 (e.g., "high") as a valid modifier term for the base term 322 (e.g., "cholesterol") and that the non-core data 668 indicates the modifier term 334 (e.g., "high") as a valid modifier term for the base term 628 (e.g., "triglyceride").

The domain-specific lexically-driven pre-parser 110 may select one of the second text or the third text as the partially parsed and bracketed input text 882. For example, the domain-specific lexically-driven pre-parser 110 may select the second text in response to determining that a greater number of terms are grouped with the modifier term 334 in the second text as compared to the third text. In a particular aspect, the domain-specific lexically-driven pre-parser 110 may select the second text in response to determining that the non-core data 668 indicates that the modifier term 334 (e.g., high) is a preferred domain-specific modifier for the base term 628 (e.g., "triglyceride"). The domain-specific lexically-driven pre-parser 110 may output the second text as the partially parsed and bracketed input text 882 (e.g., "The patient suffers from [[$_{ADJ}$ high] [[$_N$ cholesterol], [$_N$ triglycerides]]], and [$_N$ hypertension].").

The domain-specific lexically-driven pre-parser 110 may generate partially parsed and bracketed input text 884 by processing the input text 804 (e.g., "The patient has a lower extremity edema."), as described with reference to FIG. 4. For example, the domain-specific lexically-driven pre-parser 110 may generate the partially parsed and bracketed input text 884 based at least in part on the entry 602 associated with the base term 622 (e.g., "edema"), the entry 606 associated with the base term 626 (e.g., "extremity"), and the collocation rule 704, as described herein.

The domain-specific lexically-driven pre-parser 110 may determine that the input text 804 includes the base term 622 (e.g., "edema") and the base term 626 (e.g., "extremity"). The domain-specific lexically-driven pre-parser 110 may determine that the base term 622 (e.g., "edema") appears to modify the base term 626 (e.g., "extremity"), and vice versa, in the input text 804. The domain-specific lexically-driven pre-parser 110 may determine that the non-core data 662 corresponding to the base term 622 (e.g., "edema") is silent regarding whether (e.g., does not include) the base term 626 (e.g., "extremity") is a valid modifier term. The domain-specific lexically-driven pre-parser 110 may determine that the non-core data 667 corresponding to the base term 626 (e.g., "extremity") is silent regarding whether (e.g., does not include) the base term 622 (e.g., "edema") is a valid modifier term. The domain-specific lexically-driven pre-parser 110 may refrain from grouping the base term 626 with the base term 622 in response to determining that the non-core data 662 and the non-core data 667 are silent regarding whether the base term 626 and the base term 622, respectively, are valid modifier terms for each other.

The domain-specific lexically-driven pre-parser 110 may determine that a term (e.g., "lower") appears to modify the base term 626 (e.g., "extremity") in the input text 804. The domain-specific lexically-driven pre-parser 110 may, in response to determining that the term (e.g., "lower") is indicated as a valid modifier term in the non-core data 667 corresponding to the base term 626 (e.g., "extremity"), group (e.g., bracket) the term (e.g., "lower") with the base term 626 (e.g., "extremity") to generate the partially parsed and bracketed input text 884 ("The patient has a [[$_{ADJ}$ lower] [$_N$ extremity]] [$_N$ edema].")

The domain-specific lexically-driven pre-parser 110 may generate partially parsed and bracketed input text 886 by processing the input text 806 (e.g., "Release of Mr. Shah from Emergency Room by Dr. Smith at 2 PM with Mrs. Shah"), as described with reference to FIG. 4. For example, the domain-specific lexically-driven pre-parser 110 may generate the partially parsed and bracketed input text 886 based at least in part on the named-entity-based pattern rule 708 (e.g., "Release of V from W by X at Y with Z"), as described herein.

The domain-specific lexically-driven pre-parser 110 may determine that the input text 886 satisfies the pattern indicated by the named-entity-based pattern rule 708. For example, the domain-specific lexically-driven pre-parser 110 may determine that the input text 886 matches the pattern indicated by the named-entity-based pattern rule 708 in response to determining that the input text 886 includes a first term (e.g., "Release") followed by a second term (e.g., "of") followed by one or more terms (e.g., "Mr. Shah") followed by a third term (e.g., "from") followed by one or more terms (e.g., "Emergency Room") followed by a fourth term (e.g., "by") followed by one or more terms (e.g., "Dr. Smith") followed by a fifth term (e.g., "at") followed by one or more terms (e.g., "2 PM") followed by a sixth term (e.g., "with") followed by one or more terms (e.g., "Mrs. Shah").

The domain-specific lexically-driven pre-parser 110 may, in response to determining that the input text 886 matches the pattern indicated by the named-entity-based pattern rule 708, determine that the one or more terms (e.g., "Mr. Shah") between the second term (e.g., "of") and the third term (e.g., "from") correspond to a first named-entity (e.g., V) associated with a first semantic type (e.g., person_name). The domain-specific lexically-driven pre-parser 110 may also determine that the one or more terms (e.g., "Emergency Room") between the third term (e.g., "from") and the fourth term (e.g., "by") correspond to a second named-entity (e.g., W) associated with a second semantic type (e.g., department_name). The domain-specific lexically-driven pre-parser 110 may determine that the one or more terms (e.g., "Dr. Smith") between the fourth term (e.g., "by") and the fifth term (e.g., "at") correspond to a third named-entity (e.g., X) associated with a third semantic type (e.g., person_name). The domain-specific lexically-driven pre-parser 110 may determine that the one or more terms (e.g., "2 PM") between the fifth term (e.g., "at") and the sixth term (e.g., "with") correspond to a fourth named-entity (Y) associated with a fourth semantic type (e.g., time). The domain-specific lexically-driven pre-parser 110 may determine that the one or more terms (e.g., "Mrs. Smith") following the sixth term (e.g., "with") correspond to a fifth named-entity (Z) associated with a fifth semantic type (e.g., person_name).

The domain-specific lexically-driven pre-parser 110 may generate the partially parsed and bracketed input text 886 indicating the identified named-entities. For example, the partially parsed bracketed input text 886 (e.g., "Release of [$_V$ Mr. Shah] from [$_W$ Emergency Room] by [$_X$ Dr. Smith] at [$_Y$ 2 PM] with [$_Z$ Mrs. Shah]") may include a separate phrase marker corresponding to each of the named-entities.

The domain-specific lexically-driven pre-parser 110 may generate partially parsed and bracketed input text 888 by processing the input text 808 (e.g., "Prescribing of acetaminophen by Dr. Smith at Emergency Room"), as described with reference to FIG. 4. For example, the domain-specific lexically-driven pre-parser 110 may generate the partially parsed and bracketed input text 888 based at least in part on the semantico-syntactic pattern rule 710 (e.g., [ACTION] [PREP] {substance|drug} [PREP] {Agent} [PREP] {Location|Measure}), as described herein.

The domain-specific lexically-driven pre-parser 110 may determine that the input text 888 satisfies the pattern indicated by the semantico-syntactic pattern rule 710. For example, the domain-specific lexically-driven pre-parser 110 may determine that the input text 888 matches the pattern indicated by the semantico-syntactic pattern rule 710 in response to determining that the input text 888 includes at least one term corresponding to a semantic type indicated by the semantico-syntactic pattern rule 710 in the order indicated by the semantico-syntactic pattern rule 710. To illustrate, the domain-specific lexically-driven pre-parser 110 may determine that the input text 888 includes a first term (e.g., "Prescribing") corresponding to a first semantic type (e.g., [ACTION]) indicated by the semantico-syntactic pattern rule 710. The domain-specific lexically-driven pre-parser 110 may determine that the input text 888 includes a second term (e.g., "of") corresponding to a second syntactic type (e.g., [PREP]) indicated by the semantico-syntactic pattern rule 710 subsequent to the first semantic type (e.g., [ACTION]).

The domain-specific lexically-driven pre-parser 110 may, in response to determining that the input text 888 matches the pattern indicated by the semantico-syntactic pattern rule 710, generate the partially parsed and bracketed input text 888 indicating the identified instances of syntactic types, semantic types, or a combination thereof. For example, the partially parsed bracketed input text 888 (e.g., "[$_{ACTION}$ Prescribing] [$_{PREP}$ of] [$_{DRUG}$ acetaminophen] [$_{PREP}$ by] [$_{AGENT}$ Dr. Smith] [$_{PREP}$ at] [$_{LOCATION}$ Emergency Room]") may include a separate phrase marker corresponding to each of the semantic types, syntactic types, or a combination thereof. The domain-specific lexically-driven pre-parser 110 may provide the partially parsed and bracketed input text 882, the partially parsed and bracketed input text 884, the partially parsed and bracketed input text 886, the partially parsed and bracketed input text 888, or a combination thereof, to the domain-independent rule-based parser 412.

FIG. 9 illustrates a method 900 for performing domain-specific lexical analysis. The method 900 may be performed by the lexical analyzer 108, one or more of the nodes 10 of FIG. 1, the system 300 of FIG. 3, or a combination thereof. In a particular aspect, the domain-specific analysis 96 may include at least a portion of the method 900.

The method 900 includes performing an analysis of domain-specific corpus to identify a base term and a modifier term, at 902. For example, as described with reference to FIG. 3, the lexical analyzer 108 may perform an analysis of the domain-specific corpus 314 to identify the base term 322 and the modifier term 334. The modifier term 334 may modify the base term 322 in at least a portion of the domain-specific corpus 314.

The method 900 also includes accessing a first entry in lexicon data, at 904. For example, as described with reference to FIG. 3, the lexical analyzer 108 may access the entry 318 in the lexicon data 316. The entry 318 may include the core data 330 corresponding to domain-independent lexical information for the base term 322.

The method 900 further includes adding non-core data to the first entry based on the analysis, at 906. For example, as described with reference to FIG. 3, the lexical analyzer 108 may add the non-core data 340 to entry 318 based on the analysis. The non-core data 340 may correspond to domain-specific lexical information for the base term 322. The non-core data 340 identifies the modifier term 334 as a domain-specific modifier of the base term 322.

The method 900 may thus enable automatic generation of domain-specific information corresponding to a base term and updating of the lexicon data 316 to indicate the domain-specific information. In a particular implementation, the method 900 enables partially automatic generation of domain-specific information, update of the lexicon data 316, or both. For example, the lexical analyzer 108 may provide a prompt to a display indicating the non-core data 340 is going to be added to the entry 318 corresponding to the base term 322. The lexical analyzer 108 may add the non-core data 340 to the entry 318 in response to receiving a user input confirming the addition. Automatic (or at least partially automatic) generation of the domain-specific information, update of the lexicon data 316, or both, may conserve resources (e.g., time), reduce (e.g., eliminate) errors, and improve (e.g., extend) coverage.

Figure 10:
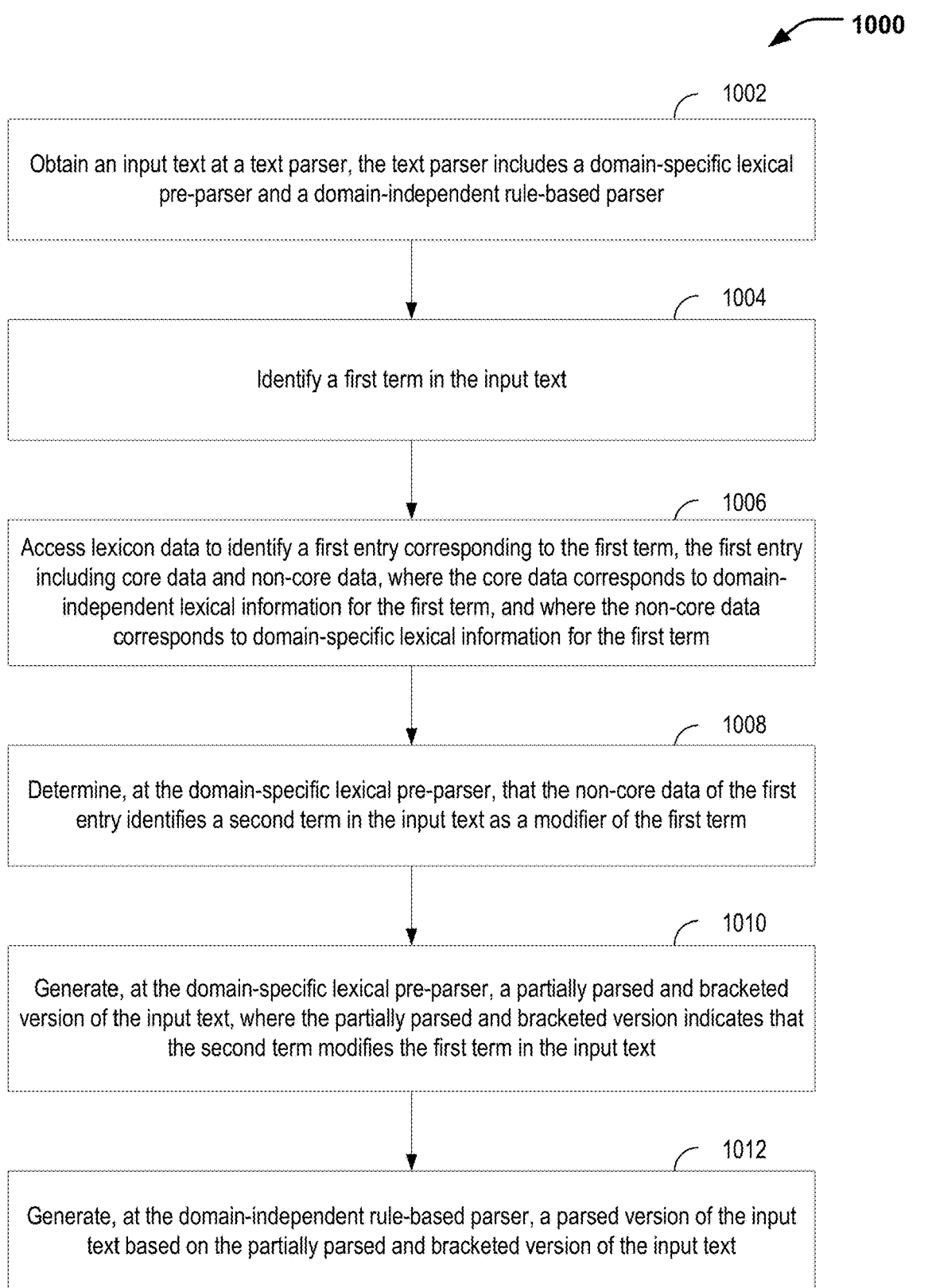
FIG. 10 illustrates a flowchart of a method of lexically-guided parsing.

FIG. 10 illustrates a method 1000 for performing lexically-driven parsing. The method 1000 may be performed by the domain-specific lexically-driven pre-parser 110, one or more of the nodes 10 of FIG. 1, the text parser 304, the system 300 of FIG. 3, the domain-independent rule-based parser 412 of FIG. 4, or a combination thereof. In a particular aspect, the domain-specific analysis 96 may include at least a portion of the method 1000.

The method 1000 includes obtaining an input text at a text parser, at 1002. For example, as described with reference to FIG. 4, the text parser 304 may obtain the input text 414. The text parser 304 may include the domain-specific lexically-driven pre-parser 110 and the domain-independent rule-based parser 412.

The method 1000 also includes identifying a first term in the input text, at 1004. For example, as described with reference to FIG. 4, the domain-specific lexically-driven pre-parser 110 may identify the term 426 in the input text 414.

The method 1000 further includes accessing lexicon data to identify a first entry corresponding to the first term, at 1006. For example, as described with reference to FIG. 4, the domain-specific lexically-driven pre-parser 110 may access the lexicon data 316 to identify the entry 318 corresponding to the term 426. The entry 318 may include core data 330 and the non-core data 340. The core data 330 may correspond to domain-independent lexical information for the term 426. The non-core data 340 may correspond to domain-specific lexical information for the term 426.

The method 1000 also includes determining, at the domain-specific lexically-driven pre-parser, that the non-core data of the first entry identifies a second term in the input text as a modifier of the first term, at 1008. For example, as described with reference to FIG. 4, the domain-specific lexically-driven pre-parser 110 may determine that the non-core data 340 of the entry 318 identifies the term 424 in the input text 414 as a modifier of the term 426.

The method 1000 further includes generating, at the domain-specific lexically-driven pre-parser, a partially parsed and bracketed version of the input text, at 1010. For example, as described with reference to FIG. 4, the domain-specific lexically-driven pre-parser 110 may generate the partially parsed and bracketed input text 480 (e.g., a partially parsed and bracketed version of the input text 414). The partially parsed and bracketed input text 480 may indicate that the term 424 modifies the term 426 in the input text 414.

The method 1000 also includes generating, at the domain-independent rule-based parser, a parsed version of the input text based on the partially parsed and bracketed version of the input text, at 1012. For example, as described with reference to FIG. 4, the domain-independent rule-based parser 412 may generate the parsed text 482 (e.g., a parsed version of the input text 414) based on the partially parsed and bracketed input text 480.

The method 1000 may thus enable pre-parsing of input text based on domain-specific information to generate partially parsed and bracketed input text. Pre-parsing based on the domain-specific information may be performed prior to parsing based on domain-independent information. For example, the partially parsed and bracketed input text may be prepared for parsing based on domain-independent information. The partially parsed and bracketed text may be parsed by a domain-independent rule-based parser. The pre-parsing may reduce (and even, eliminate) syntactic ambiguity in the text, thereby reducing (or eliminating) parsing errors in the parsed text.

Figure 11:
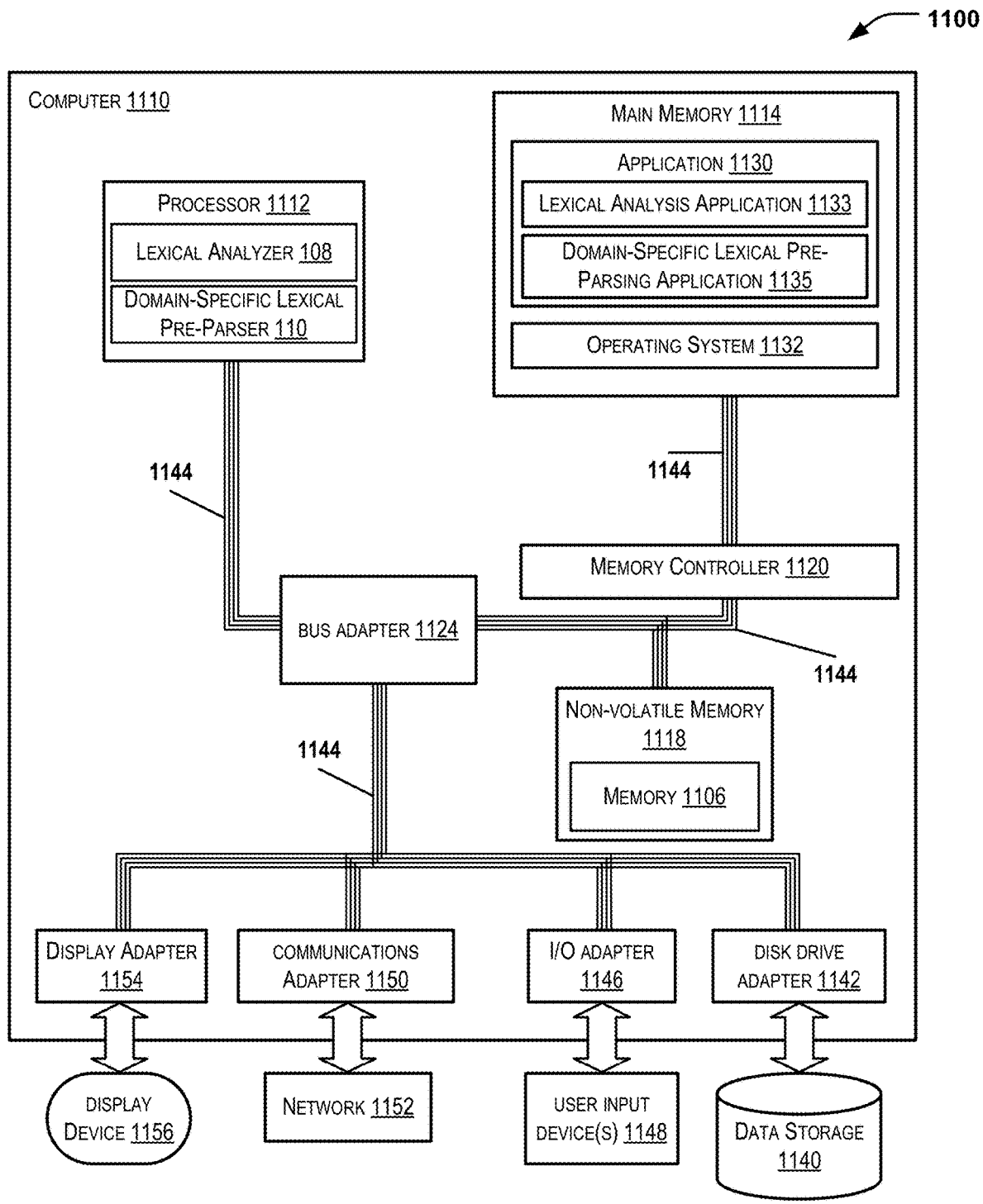
FIG. 11 illustrates a block diagram of a computing environment according to an aspect that includes electronic components through which the described systems may be implemented.

FIG. 11 is a block diagram 1100 of a computing environment according to a first aspect that includes electronic components through which the described system may be implemented. The components in FIG. 11 support aspects of computer-implemented methods and computer-executable program instructions or code according to the present disclosure. For example, the computing device 1110, or portions thereof, may execute instructions to perform domain-specific lexical analysis such as described with respect to the lexical analyzer 108 of FIG. 1, perform domain-specific pre-parsing such as described with respect to the domain-specific lexically-driven pre-parser 110 of FIG. 1, or a combination thereof.

In FIG. 11, the computing device 1110 may include a processor 1112, a main memory 1114, an input/output (I/O) adapter 1146, a non-volatile memory 1118, a memory controller 1120, a bus adapter 1124, a display adapter 1154, a communications adapter 1150, and a disk drive adapter 1142. The I/O adapter 1146 may be configured to interface with one or more user input devices 1148. For example, the I/O adapter 1146 may communicate via serial interfaces (e.g., universal serial bus (USB) interfaces or Institute of Electrical and Electronics Engineers (IEEE) 1394 interfaces), parallel interfaces, display adapters, audio adapters, and other interfaces. The user input devices 1148 may include keyboards, pointing devices, displays, speakers, microphones, touch screens, magnetic field generation devices, magnetic field detection devices, and other devices. The processor 1112 may detect interaction events based on user input received via the I/O adapter 1146. Additionally, the processor 1112 may send a graphical user interface (GUI) and related elements to a display device via the I/O adapter 1146.

The processor 1112 may include the lexical analyzer 108, the domain-specific lexically-driven pre-parser 110, or both. The main memory 1114 may include volatile memory devices (e.g., random access memory (RAM) devices), nonvolatile memory devices (e.g., read-only memory (ROM) devices, programmable read-only memory, and flash memory), or both. The main memory 1114 of the computer 1110 includes software, such as an operating system 1132 and software applications 1130. The operating system 1132 may include a basic/input output system for booting the computing device 1110 as well as a full operating system to enable the computing device 1110 to interact with users, other programs, and other devices. The software applications 1130 may include lexical analysis application 1133, a domain-specific lexically-driven pre-parsing application 1135, or both. The lexical analysis application 1133 may include, be included within, or correspond to one or more of the lexical analyzer 108. The domain-specific lexically-driven pre-parsing application 1135 may correspond to the domain-specific lexically-driven pre-parser 110. The non-volatile memory 1118 may include a memory 1106. The memory 1106 may correspond to the memory 306 of FIG. 3, the memory 406 of FIG. 4, or both.

The display adapter 1154 may be configured to interface with a display device 1156. The communications adapter 1150 may be configured to interface with the one or more networks 1152. The disk drive adapter 1142 may be configured to interface with one or more data storage devices 1140. The data storage devices 1140 may include nonvolatile storage devices, such as magnetic disks, optical disks, or flash memory devices. The data storage devices 1140 may include both removable and non-removable memory devices. The data storage devices 1140 may be configured to store an operating system, images of operating systems, applications, and program data. One or more buses 1144 or other communication circuitry may enable the various components of the computer 1110 to communicate with one another.

The data storage device 1140, the main memory 1114, the non-volatile memory 1118, the memory 1106, or a combination thereof, may include computer-readable storage devices that store instructions executable by the processor 1112 to cause the processor 1112 to perform certain operations. For example, the operations may include performing an analysis of domain-specific corpus to identify a base term and a modifier, accessing an entry in lexicon data, and adding non-core data to the entry identifying the modifier term as a domain-specific modifier of the base term. As another example, the operations may include obtaining an input text, identifying a first term in the input text, accessing lexicon data to identify an entry corresponding to the first term, determining that non-core data of the entry identifies a second term of the input text as a modifier of the first term, generating a partially parsed and bracketed version of the input text that indicates that the second term modifies the first term, and generating a parsed version of the input text based on the partially parsed and bracketed version of the input text.

The present disclosure may include a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer program product for domain-specific data generation, the computer program product comprising a computer-readable storage medium having program instructions embodied therewith, the program instructions executable by a processor at an electronic device to cause the processor to perform operations comprising:
   initiating an analysis on a domain-specific corpus associated with a particular domain to:
      identify the particular domain; and
      identify a base term and a modifier term, the base term and the modifier term
   identified independently from the particular domain, wherein the modifier term: (i) modifies the base term in at least a portion of the domain-specific corpus, and (ii) is designated as a modifier term based, at least in part, upon co-occurrence statistics that indicate that an identified term appears to modify the base term a minimum number of times;
   accessing a first entry in lexicon data, wherein the lexicon data is accessible by the electronic device prior to the initiating and is configured for use at the electronic device in a language processing operation, the first entry including core data corresponding to domain-independent lexical information for the base term;
   adding, based on the analysis, non-core data to the first entry, the non-core data corresponding to domain-specific lexical information for the base term, wherein the non-core data identifies the modifier term and the particular domain;

determining that a first portion of the non-core data is in a specific position relative to the identified base term;

responsive to the determination that the first portion of the non-core data is in the specific position relative to the identified base term, generating a first collocation rule; and responsive to the generation of the first collocation rule, parsing, with the first collocation rule, the first entry in lexicon data to determine a first future placement for the first portion of the non-core data.

2. The computer program product of claim 1, wherein the language processing operation includes processing a language sample, by a parser, based on the lexicon data, and wherein the operations further comprise determining that the modifier term modifies the base term based on at least one of co-occurrence statistics or user input.

3. The computer program product of claim 2, wherein the operations further comprise generating the co-occurrence statistics based on the analysis of the domain-specific corpus, and wherein the co-occurrence statistics indicate a number of times the modifier term is next to the base term in the domain-specific corpus.

4. The computer program product of claim 1, wherein the operations further comprise updating, based on the analysis of the domain-specific corpus, the non-core data to identify one or more second modifier terms as one or more additional domain-specific modifiers of the base term.

5. The computer program product of claim 1, wherein:
the lexicon data includes data stored at the electronic device prior to the initiating, an input from another device, an input from a user, or a combination thereof, and
the non-core data includes one or more additional modifier terms for the base term for a second domain that is distinct from a first domain associated with the domain-specific corpus.

6. The computer program product of claim 1 wherein the first collocation rule includes information indicative of a set of future placements for the non-core data relative to the identified base term.

7. A system comprising:
a memory included in an electronic device, the memory configured to store lexicon data, wherein the lexicon data is accessible by the electronic device prior to initiation of an analysis and is configured for use at the electronic device in a language processing operation;
a lexical analyzer configured to:
initiate the analysis on a domain-specific corpus associated with a particular domain to:
identify the particular domain; and
identify a base term and a modifier term, the base term and the modifier term identified independently from the particular domain, wherein the modifier term: (i) modifies the base term in at least a portion of the domain-specific corpus, and (ii) is designated as a modifier term based, at least in part, upon a co-occurrence statistics that indicate that an identified term appears to modify the base term a minimum number of times;
access a first entry in the lexicon data, the first entry including core data corresponding to domain-independent lexical information for the base term; and
add, based on the analysis, non-core data to the first entry, the non-core data corresponding to domain-specific lexical information for the base term,
wherein the non-core data identifies the modifier term and the particular domain;
determine that a first portion of the non-core data is in a specific position relative to the identified base term;
responsive to the determination that the first portion of the non-core data is in the specific position relative to the identified base term, generating a first collocation rule; and
responsive to the generation of the first collocation rule, parsing, with the first collocation rule, the first entry in lexicon data to determine a first future placement for the first portion of the non-core data.

8. The system of claim 7, wherein the language processing operation includes processing a language sample, by a parser, based on the lexicon data, and wherein the lexical analyzer is further configured to update, based on the analysis of the domain-specific corpus, the non-core data to identify one or more second modifier terms as one or more additional domain-specific modifiers of the base term.

9. The system of claim 7, wherein the non-core data includes one or more additional modifier terms for the base term for a second domain that is distinct from a first domain associated with the domain-specific corpus.

10. The system of claim 7, further comprising a domain-specific lexically-driven pre-parser, wherein the lexical analyzer is further configured to generate, based on the domain-specific corpus, domain-specific parsing rules for the domain-specific lexically-driven pre-parser.

11. The system of claim 10, wherein the text includes input text, and wherein the domain-specific lexically-driven pre-parser is configured to:
perform domain-specific analysis of the input text based on the non-core data; and
provide a partially parsed and bracketed version of the input text to a domain-independent rule-based parser.

12. The system of claim 7 wherein the first collocation rule includes information indicative of a set of future placements for the non-core data relative to the identified base term.

* * * * *